US011530834B2

(12) United States Patent
Fujii et al.

(10) Patent No.: US 11,530,834 B2
(45) Date of Patent: Dec. 20, 2022

(54) AIR-CLEANING DEVICE

(71) Applicant: SHARP KABUSHIKI KAISHA, Sakai (JP)

(72) Inventors: Katsushi Fujii, Sakai (JP); Takahide Fujii, Sakai (JP); Daisuke Moriuchi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 620 days.

(21) Appl. No.: 16/604,066

(22) PCT Filed: Feb. 21, 2018

(86) PCT No.: PCT/JP2018/006304
§ 371 (c)(1),
(2) Date: Oct. 9, 2019

(87) PCT Pub. No.: WO2018/190003
PCT Pub. Date: Oct. 18, 2018

(65) Prior Publication Data
US 2020/0033020 A1 Jan. 30, 2020

(30) Foreign Application Priority Data

Apr. 10, 2017 (JP) .............................. JP2017-077487
Nov. 28, 2017 (JP) .............................. JP2017-228288

(51) Int. Cl.
*F24F 11/49* (2018.01)
*F24F 11/65* (2018.01)
(Continued)

(52) U.S. Cl.
CPC .......... *F24F 11/49* (2018.01); *B01D 46/0038* (2013.01); *B01D 46/442* (2013.01);
(Continued)

(58) Field of Classification Search
CPC .. B01D 46/442; B01D 46/46; B01D 2279/50; B01D 46/0038; F24F 3/16; F24F 8/00;
(Continued)

(56) References Cited

U.S. PATENT DOCUMENTS

2011/0154985 A1* 6/2011 Mittelmark ............... F24F 3/16
 47/20.1
2015/0088272 A1 3/2015 Drew
(Continued)

FOREIGN PATENT DOCUMENTS

JP S64-56994 A 3/1989
JP H01-291040 A 11/1989
(Continued)

OTHER PUBLICATIONS

JP1-291040 machine translation. (Year: 1989).*
(Continued)

*Primary Examiner* — Marc E Norman
(74) *Attorney, Agent, or Firm* — ScienBiziP, P.C.

(57) ABSTRACT

Air-cleaning control is performed in accordance with a situation of motion of a person and brightness in a room. An air-cleaning device (100) includes: a first determination unit (11) that determines, from a detection signal from a person detection sensor (31), whether a state of an air-cleaning target room is at least any of a state where a person is absent in the air-cleaning target room, a state where a person is present and a motion amount is small, and a state where a person is present and the motion amount is large; a second determination unit (12) that determines, from a detection signal from as illuminance sensor (32), whether the state of the air-cleaning target room is at least any of a state where it is bright inside the air-cleaning target room and a state where it is dark inside the air-cleaning target room; and an operation control unit (13) that controls an operation of an
(Continued)

air-cleaning function by using determination results of the first determination unit (11) and the second determination unit (12).

13 Claims, 14 Drawing Sheets

(51) Int. Cl.

| | | |
|---|---|---|
| *B01D 46/44* | (2006.01) | |
| *B01D 46/46* | (2006.01) | |
| *F24F 3/16* | (2021.01) | |
| *G06F 3/16* | (2006.01) | |
| *B01D 46/00* | (2022.01) | |
| *F24F 110/64* | (2018.01) | |
| *F24F 110/50* | (2018.01) | |
| *F24F 130/20* | (2018.01) | |
| *F24F 120/12* | (2018.01) | |
| *F24F 120/14* | (2018.01) | |
| *F24F 130/40* | (2018.01) | |
| *F24F 110/60* | (2018.01) | |

(52) U.S. Cl.
CPC ............... *B01D 46/46* (2013.01); *F24F 3/16* (2013.01); *F24F 11/65* (2018.01); *G06F 3/165* (2013.01); *B01D 2279/50* (2013.01); *F24F 2110/50* (2018.01); *F24F 2110/60* (2018.01); *F24F 2110/64* (2018.01); *F24F 2120/12* (2018.01); *F24F 2120/14* (2018.01); *F24F 2130/20* (2018.01); *F24F 2130/40* (2018.01)

(58) Field of Classification Search
CPC ....... F24F 8/30; F24F 2110/50; F24F 2110/60; F24F 2110/64; F24F 2120/12; F24F 2120/14; F24F 2130/20; F24F 2130/40; F24F 11/49; F24F 11/65; G06F 3/165
See application file for complete search history.

(56) References Cited

U.S. PATENT DOCUMENTS

| | | | |
|---|---|---|---|
| 2016/0265803 A1 | 9/2016 | Mori | |
| 2018/0154297 A1* | 6/2018 | Maletich | ................... F24F 3/16 |
| 2020/0030478 A1* | 1/2020 | Uchimura | ................ F24F 11/50 |

FOREIGN PATENT DOCUMENTS

| | | | |
|---|---|---|---|
| JP | H07-248143 A | 9/1995 | |
| JP | H08-35717 A | 2/1996 | |
| JP | 2001-317764 A | 11/2001 | |
| JP | 2007-130517 A | 5/2007 | |
| JP | 2009-192132 A | 8/2009 | |
| JP | 2009-274050 A | 11/2009 | |
| JP | 2012-002461 A | 1/2012 | |
| JP | 2012-097955 A | 5/2012 | |
| JP | 2012-154526 A | 8/2012 | |
| JP | 2014-182583 A | 9/2014 | |
| JP | 2015-075305 A | 4/2015 | |
| JP | 2016-180561 A | 10/2016 | |

OTHER PUBLICATIONS

JP 7-248143 machine translation. (Year: 1995).*
JP 2001-317764 machine translation (Year: 2001).*
JP 2012-15426 machine translation. (Year: 2012).*
JP 2012-97955 machine translation. (Year: 2012).*
JP 2015-75305 machine translation. (Year: 2015).*
JP 2016-180561 machine translation. (Year: 2016).*
JP 2009-274050 machine translation. (Year: 2009).*
JP 2007-130517 machine translation. (Year: 2007).*

* cited by examiner

FIG. 4

| ILLUMINANCE | PERSON DETECTION | CONDITION TO SHIFT TO PERSON DETECTION OF "ABSENCE" | CONDITION TO SHIFT TO PERSON DETECTION OF "SMALL AMOUNT OF MOTION" | CONDITION TO SHIFT TO PERSON DETECTION OF "LARGE AMOUNT OF MOTION" | NOTE |
|---|---|---|---|---|---|
| [SL1] BRIGHT | [Sp1] ABSENCE | — | PERSON DETECTION OF "PRESENCE" | — | |
| | [Sp2] SMALL AMOUNT OF MOTION | PERSON DETECTION OF "ABSENCE" CONTINUES FOR 15 MINUTES | — | TIME OF PERSON DETECTION OF "PRESENCE" IN 1 MINUTE IS 25 SECONDS OR MORE | |
| | [Sp3] LARGE AMOUNT OF MOTION | — | TIME OF PERSON DETECTION OF "PRESENCE" IN 5 MINUTES IS LESS THAN 30 SECONDS | — | CONTINUE FOR 5 MINUTES WHEN SHIFTING TO PERSON DETECTION OF "LARGE AMOUNT OF MOTION" ONCE. |
| [SL2] DARK | [Sp1] ABSENCE | — | PERSON DETECTION OF "PRESENCE" | — | |
| | [Sp2] SMALL AMOUNT OF MOTION | PERSON DETECTION OF "ABSENCE" CONTINUES FOR 1 HOUR | — | TIME OF PERSON DETECTION OF "PRESENCE" IN 5 MINUTES IS 30 SECONDS OR MORE | CONTINUE FOR 5 MINUTES WHEN SHIFTING TO PERSON DETECTION OF "SMALL AMOUNT OF MOTION" ONCE. |
| | [Sp3] LARGE AMOUNT OF MOTION | — | TIME OF PERSON DETECTION OF "PRESENCE" IN 5 MINUTES IS LESS THAN 30 SECONDS | — | CONTINUE FOR 5 MINUTES WHEN SHIFTING TO PERSON DETECTION OF "LARGE AMOUNT OF MOTION" ONCE. |

FIG. 6

| SENSOR | | HUMIDIFICATION | AIR VOLUME |
|---|---|---|---|
| PERSON DETECTION | DUST ODOR | | |
| [Sp3] LARGE AMOUNT OF MOTION | SET HIGH SENSITIVITY | ON | HIGH AUTO |
| [Sp2] SMALL AMOUNT OF MOTION | NO CHANGE | | |
| [Sp1] ABSENCE | NO CHANGE | OFF | POWERFUL |

FIG. 13

| SPEECH CONTENT | SPEECH CONDITION 1 (TRIGGER) | SPEECH CONDITION 2 | CHANGE OF DISPLAY UNIT | REPEAT | PRIORITY |
|---|---|---|---|---|---|
| JINGLE | | | | | |
| ~~"YOU COME BACK. HUMIDIFICATION STARTS AGAIN."~~ | | | | | |
| GOOD "YOU COME BACK. HUMIDIFICATION STARTS IMMEDIATELY." | "SMALL AMOUNT OF MOTION OF PERSON" OR "LARGE AMOUNT OF MOTION OF PERSON" IS DETECTED AFTER "ABSENCE" OF PERSON DETECTION SENSOR CONTINUES FOR 6 HOURS OR MORE → AFTER HUMIDIFICATION STARTS AGAIN | · IN CASE OF "AUTOMATED" OR "FEEL EFFECT"<br>· "SMALL AMOUNT OF MOTION OF PERSON" OR "LARGE AMOUNT OF MOTION OF PERSON" IS DETECTED AFTER "ABSENCE" OF PERSON DETECTION SENSOR CONTINUES FOR 6 HOURS OR MORE → AFTER HUMIDIFICATION STARTS AGAIN<br>· MASKING FOR 1 MINUTE AFTER OPERATION STARTS<br>· WHEN ILLUMINANCE IS DARK, SPEECH IS NOT PRODUCED IMMEDIATELY, AND WHEN ILLUMINANCE IS BRIGHT IN 1 MINUTE, SPEECH IS PRODUCED.<br>· 6 HOURS HAVE LAPSED AFTER SAME SPEECH IN PREVIOUS TIME. | NO CHANGE | ○ | 1 |

AIR-CLEANING DEVICE

TECHNICAL FIELD

The present invention relates to an air-cleaning device or the like that is mounted with a person detection sensor and an illuminance sensor.

BACKGROUND ART

An air-cleaning device mounted with a person detection sensor and an illuminance sensor has been conventionally known. For example, PTL 1 cited below discloses an air-cleaning device that controls an output by determining whether a person is present in a room and by utilizing brightness in the room.

CITATION LIST

Patent Literature

PTL 1: Japanese Unexamined Patent Application Publication No. 2012-97955 (published on May 24, 2012)

SUMMARY OF INVENTION

Technical Problem

However, a conventional technique as described above has a problem that the air-cleaning device is unnecessarily operated because the air-cleaning device is operated without considering the amount of motion of a person in an air-cleaning target room.

An aspect of the invention is made in view of the aforementioned problem and an object thereof is to perform air-cleaning control in accordance with a situation of motion of a person and brightness in an air-cleaning target room and provide an optimum air environment.

Solution to Problem

In order to solve the aforementioned problem, an air-cleaning device according to an aspect of the invention is an air-cleaning device mounted with a person detection sensor that detects motion of a person and an illuminance sensor that detects brightness in a room. The air-cleaning device includes: a first determination unit that determines, from a detection signal from the person detection sensor, whether a state of an air-cleaning target room is at least any of a state where a person is absent in the air-cleaning target room, a state where a person is present in the air-cleaning target room and a motion amount is small, and a state where a person is present in the air-cleaning target room and the motion amount is large; a second determination unit that determines, from a detection signal from the illuminance sensor, whether the state of the air-cleaning target room is at least any of a state where it is bright inside the air-cleaning target room and a state where it is dark inside the air-cleaning target room; and an operation control unit that controls an operation of an air-cleaning function by using determination results of the first determination unit and the second determination unit.

Advantageous Effects of Invention

According to an aspect of the invention, an effect that air-cleaning control is able to be performed in accordance with a situation of motion of a person and brightness in as air-cleaning target room is exerted.

BRIEF DESCRIPTION OF DRAWINGS

FIG. 4 is a view in which conditions under which the air-cleaning device determines each of states in an air-cleaning target room are sorted.

FIG. 6 is a view in which operation control in each of states in the air-cleaning target room of the air-cleaning device is sorted.

FIG. 13 is a table illustrating a relationship between a speech content and a speech condition in the air-cleaning device illustrated in FIG. 10.

DESCRIPTION OF EMBODIMENTS

Embodiment 1

Figure 1:
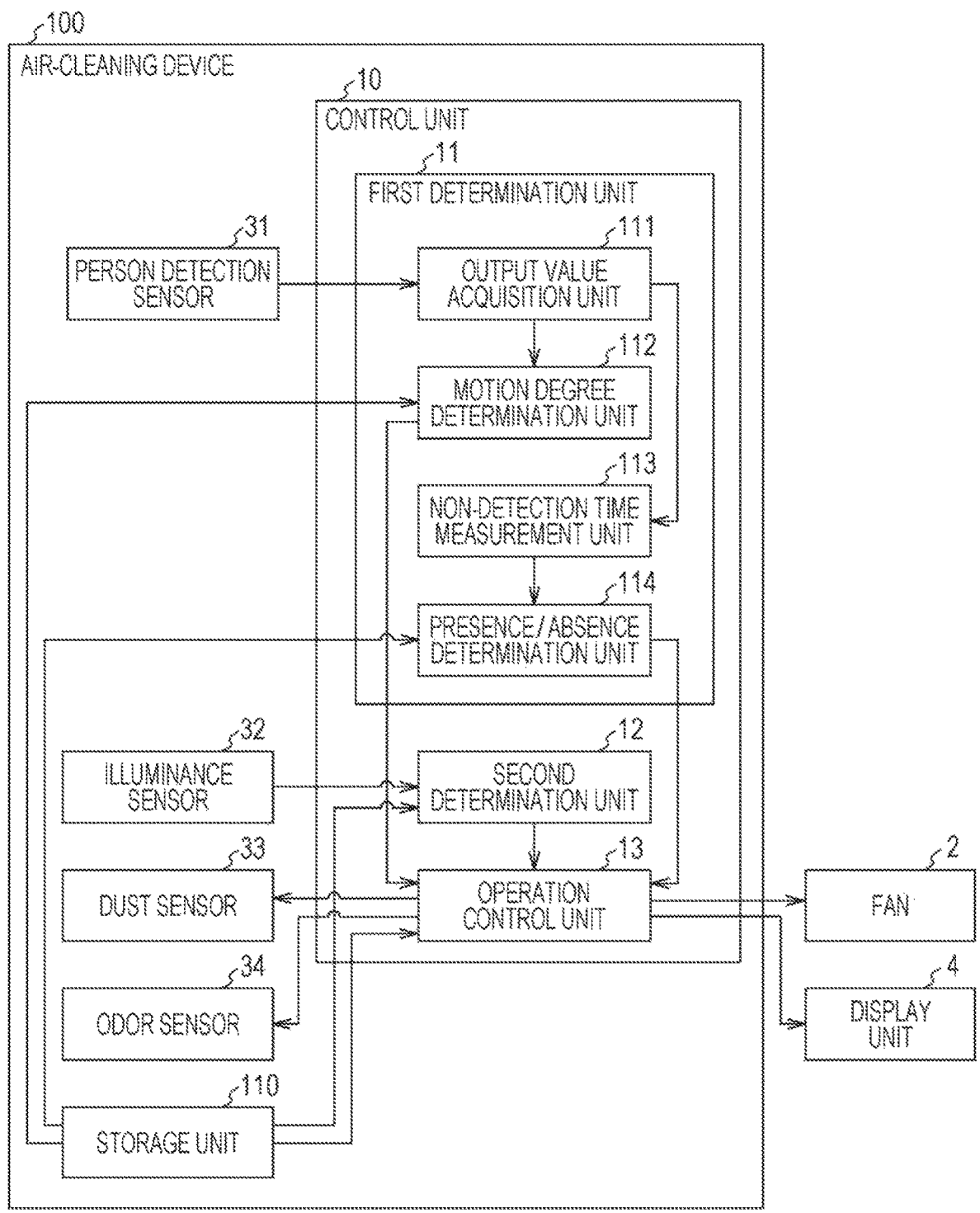
FIG. 1 is a functional block diagram illustrating a schematic configuration of an air-cleaning device according to Embodiment 1 of the invention.

An embodiment of the invention will be described below with reference to FIGS. 1 to 4.

An air-cleaning device 100 has an air-cleaning function of sucking air around the air-cleaning device 100 and removing a foreign object, such as dust, included in the air and may further have a dehumidification function of removing moisture included in air and a humidification function of increasing a humidity of air. An air-cleaning device having the humidification function will be specifically described in Embodiment 2.

Further, the air-cleaning device 100 may include an ion generator that allows ions to be contained in air from which a foreign object has been removed. The ion generator generates ions by causing atmospheric discharge. The ion generator is preferably configured to generate a positive ion $H^+(H_2O)m$ and a negative ion $O_2^-(H_2O)n$ when m and n are any natural numbers. In this case, the positive and negative ions are attached to a surface of a floating bacteria or virus in the air for reaction and active species OH radical (.OH) or hydrogen peroxide ($H_2O_2$) is generated on the surface, so that an effect of sterilization or the like is able to be exerted.

The air-cleaning device 100 recognizes a use situation of the air-cleaning device 100 by a person by combining a detection result of a person detection sensor 31 and a detection result of an illuminance sensor 32 and provides an air environment according to the use situation. To facilitate understanding of the air-cleaning device 100, first, an outline of the air-cleaning device 100 is sorted below.

(Outline of Air-Cleaning Device)

On the basis of the detection result (output signal) of the person detection sensor 31, the air-cleaning device 100 determines whether a state of an air-cleaning target room R is at least any of a "state where a person is absent in the air-cleaning target room R (hereinafter, simply represented as a "state Sp1")", a "state where a person is present in the air-cleaning target room R and an amount of motion is small (hereinafter, simply represented as a "state Sp2")", and a "state where a person is present in the air-cleaning target room R and the amount of motion is large (hereinafter, simply represented as a "state Sp3")".

On the basis of the detection result (output signal) of the illuminance sensor 32, the air-cleaning device 100 also determines whether the state of the air-cleaning target room R is at least any of a "state where it is bright inside the air-cleaning target room R (hereinafter, simply represented as a "state SL1")" and a "state where it is dark inside the air-cleaning target room R (hereinafter, simply represented as a "state SL2")". By using results of the determination, the air-cleaning device 100 controls an operation of the air-cleaning function. The control of the operation performed by the air-cleaning device 100 with use of the results of the determination is sorted as indicated in (1) to (4) described below.

(1) The state Sp3 is a situation where dust easily floats or a situation where odor is easily generated because the person actively moves. The air-cleaning device 100 sets a sensor sensitivity level of at least one of a dust sensor 33 and an odor sensor 34 to "high" and increases an air blow volume compared to a usual volume to clean air promptly. In a case of the dust sensor 33, setting of the sensor sensitivity level to "high" specifically means that a criterion for determining a degree of an amount of dust detected by the dust sensor 33 is reduced, that is, it is determined that "there is dust" even when a smaller amount of dust is detected. Further, in a case of the odor sensor 34, it means that a criterion for determining a degree of odor detected by the odor sensor 34 is reduced, that is, it is determined that "odor is generated" even when a smaller amount of odor is detected.

(2) The state Sp1 is a state where the air-cleaning device 100 does not need to inform an operation situation to a person because a person is absent in the air-cleaning target room R. Thus, the air-cleaning device 100 suppresses display or turns off light of a display unit 4 by considering energy saving.

(3) The state SL2 is a state where the air-cleaning device 100 is used in a quiet environment, for example, where a person is sleeping. Thus, the air-cleaning device 100 makes an air blow volume of air released from the air-cleaning device 100 weak to clean the air quietly.

(4) A normal operation is performed in a state other than (1) to (3) described above.

(Details of Air-Cleaning Device)

Figure 2:
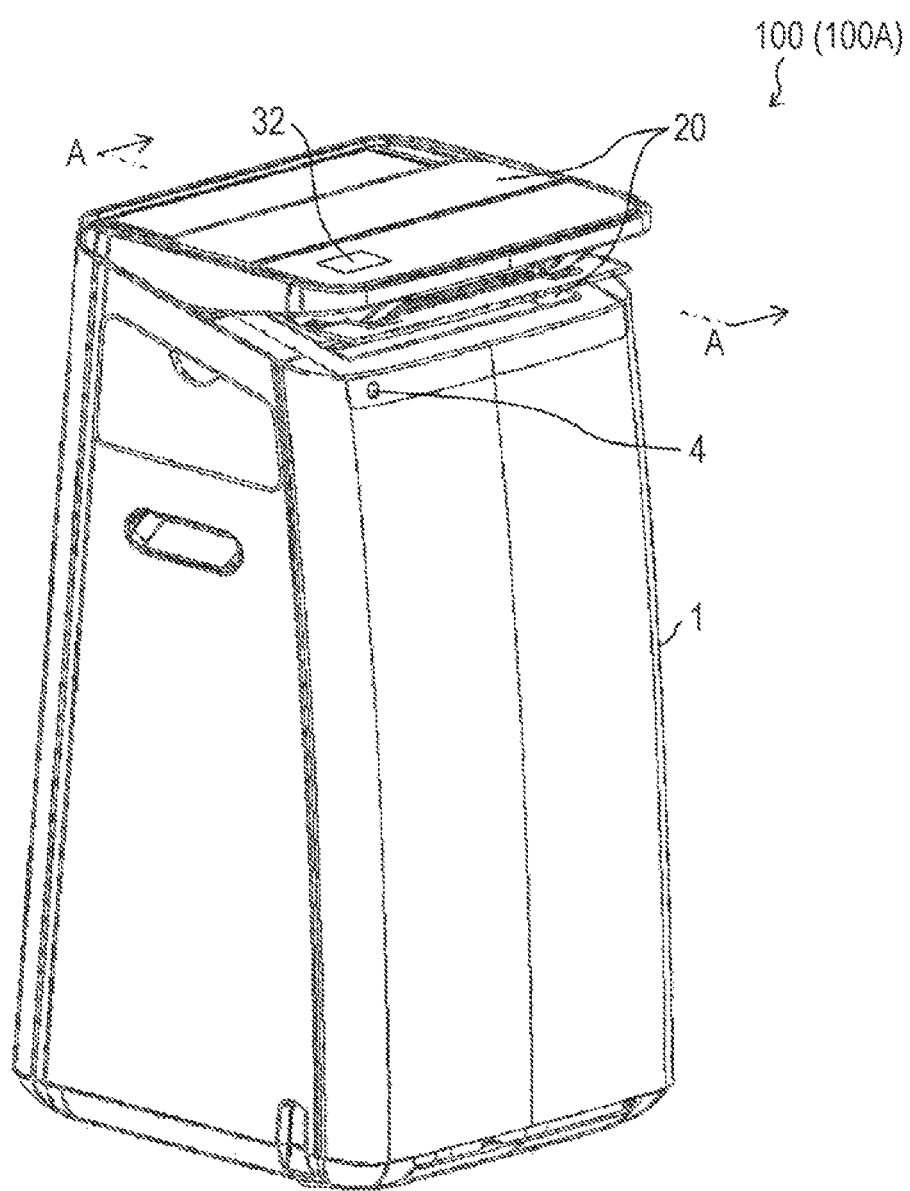
FIG. 2 is a perspective view illustrating an outline of the air-cleaning device.
Figure 3:
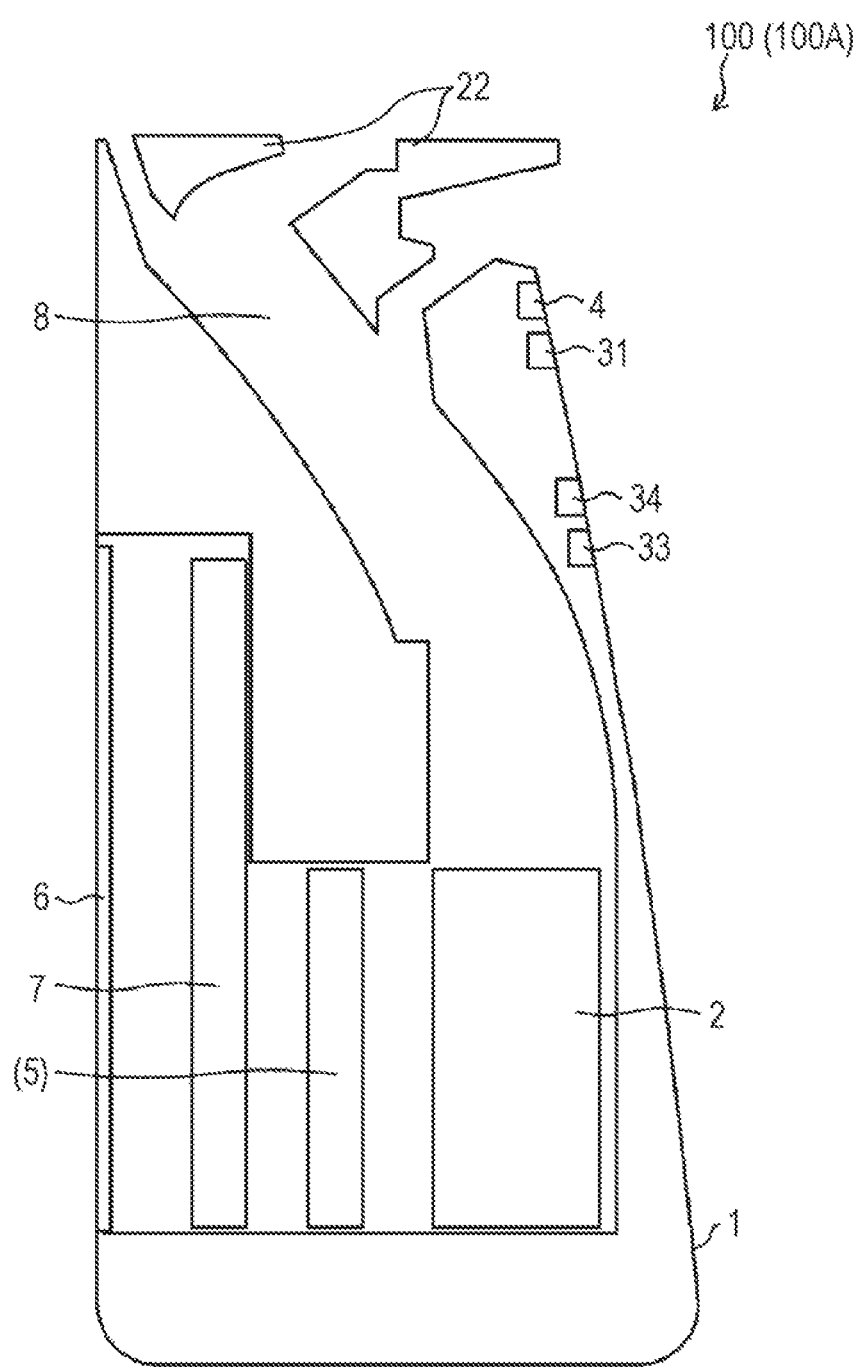
FIG. 3 is a sectional view taken along a line A-A of FIG. 2 and illustrating an outline of the air-cleaning device.

As to the air-cleaning device 100 operation control of which has been described above, a detailed configuration of the air-cleaning device 100 will be described next with reference to FIGS. 1 to 3. FIG. 1 is a functional block diagram illustrating a schematic configuration of the air-cleaning device 100. FIG. 2 is a perspective view illustrating as outline of the air-cleaning device 100. FIG. 3 is a sectional view taken along a line A-A of FIG. 2 and illustrating an outline of the air-cleaning device 100.

The air-cleaning device 100 illustrated in FIG. 1 has a configuration including a main body 1, a fan 2, the display unit 4, an inlet 6, an air-cleaning filter 7, a control unit 10, an outlet 20, the person detection sensor 31, the illuminance sensor 32, the dust sensor 33, and the odor sensor 34 as illustrated in FIGS. 1 to 3. Note that, for simplification in the description, a component that is not directly relevant to the present embodiment is omitted in the description and figures. However, the air-cleaning device 100 may include such an omitted component in accordance with actual condition of implementation.

The inlet 6 is positioned in a lower part of a back surface of the main body and used to suck air into an inside. The air-cleaning filter 7 that removes dust from the air to be sucked is provided on a main body 1 side of the inlet 6. The air-cleaning filter 7 is able to use, for example, an HEPA (High Efficiency Particulate Air) filter. The air-cleaning filter 7 may also use a deodorization filter in combination.

The outlet 20 is arranged at a top of the main body 1 and used to blow out cleaned air. The outlet 20 is provided with a louver 22 that changes a direction of air.

The fan 2 is attached to an inside a fan casing (not illustrated). To perform an air-cleaning operation, the fan. 2 is driven, and air in the air-cleaning target room. R is sucked into the main body 1 through the inlet 6 and caused to pass through the air-cleaning filter 7. In the process, dust included in the air-cleaning target room R is filtered by the air-cleaning filter 7. The cleaned air from which the dust has been removed is guided to the inside of the fan casing and to the outlet 20 through an air route 8 and released into the air-cleaning target room R from the outlet 20. An operation of the fan. 2 is controlled by an operation control unit 13 described later.

The person detection sensor 31 detects motion of a person in the air-cleaning target room R. The person detection sensor 31 is constituted by, for example, a pyroelectric sensor or the like. In a case where the person detection sensor 31 is the pyroelectric sensor, the person detection sensor 31 senses a change of heat (amount of infrared ray) caused when a body of the person moves, and outputs a signal. The person detection sensor 31 outputs the signal, for example, so that a signal of a low level and a signal of a high level are respectively output to a first determination unit 11 described later in a case of person detection of "absence" and in a case of person detection of "presence". Here, the person detection of "absence" indicates that the person detection sensor 31 does not detect a person, that is, a person is absent in the air-cleaning target room R. The person detection of "presence" indicates that the person detection sensor 31 detects a person, that is, a person is present in the air-cleaning target room R.

Specifically, the person detection sensor 31 acquires information about presence or absence of movement of heat every predetermined time and determines presence or absence of the person detection on the basis of the acquired information about presence or absence of movement of heat. The predetermined time is, for example, 25 milliseconds. As a result of acquiring the information about presence or absence of the change of heat every predetermined time described above, for example, when "presence of movement of heat" is acquired four or more times out of ten times, the person detection sensor 31 performs determination as the person detection of "presence", and when "presence of movement of heat" is acquired three or less times out of ten times, the person detection sensor 31 performs determination as the person detection of "absence". In the case of the determination as the person detection of "presence", the person detection sensor 31 outputs the signal of the high level indicating the person detection of "presence" to the first determination unit. 11, and in the case of the determination as the person detection of "absence", the person detection sensor 31 outputs the signal of the low level indicating the person detection of "absence" to the first determination unit 11.

The illuminance sensor 32 detects brightness in the air-cleaning target room R. Specifically, the illuminance sensor 32 detects (senses) illuminance in the air-cleaning target room R and outputs a level of the detected illuminance to a second determination unit 12 as a detection result.

The display unit 4 displays an operation state or the like of the air-cleaning device 100. The display unit 4 may display information or the like related to an environment (in particular, a state of air in the air-cleaning target room R) in the air-cleaning target room R, for example, such as cleanness (an amount of dust or the like), a temperature, or a humidity of the air in the air-cleaning target room R. The display of the display unit 4 is controlled by the operation control unit 13 described later.

(About Odor Sensor and Dust Sensor)

The air-cleaning device 100 includes at least one of the dust sensor 33 and the odor sensor 34. The dust sensor 33 and the odor sensor 34 are arranged in a front surface of the main body 1, for example, as illustrated in FIG. 3. When a sensor sensitivity level of at least one of the dust sensor 33 and the odor sensor 34 is set to "high", the air-cleaning device 100 promptly detects and removes dust or odor. In other words, in a case of performing the air-cleaning function while making the sensor sensitivity level of at least one of the dust sensor 33 and the odor sensor 34 high, the air-cleaning device 100 promptly detects and removes dust and odor.

The dust sensor 33 detects a dust amount in the air-cleaning target room R and a detection result is output, for example, to a part where an operation of the air-cleaning function is controlled. Note that, the dust sensor 33 may be a sensor that senses not only dust but also fine particles of pollen, PM2.5, or the Like. The odor sensor 34 is used to detect odor and output a degree of the odor, and a well-known sensor such as a sensor constituted by a metal oxide semiconductor is usable, for example. Note that, the odor sensor 34 may be a sensor that senses not only odor but also gas.

(Storage Unit)

A storage unit 110 stores various kinds of data used by the air-cleaning device 100. That is, the storage unit 110 stores (1) a control program, (2) an OS program, (3) an application program to perform various functions, which are performed by the air-cleaning device 100, and (4) various kinds of data read out to perform the application program. Data of (1) to (4) described above is stored in a non-volatile storage device, for example, such as a ROM (read only memory), a flash memory, an EPROM (Erasable Programmable ROM), an EEPROM (registered trademark) (Electrically EPROM), or an HDD (Hard Disc Driver). Moreover, the storage unit 110 particularly stores a first determination table 120 and a second determination table 130.

The first determination table 120 stores a condition (determination criterion) under which the first determination unit 11 described later performs determination about presence/absence of a person (user) in the air-cleaning target room R and motion thereof from a detection signal from the person detection sensor 31.

The second determination table 130 stores a condition (determination criterion) under which the second determination unit 12 performs determination about illuminance in the air-cleaning target room R from a detection signal from the illuminance sensor 32.

(Control Unit)

The control unit 10 controls functions of the air-cleaning device 100 in an integral manner. The control unit 10 illustrated in the figure includes the first determination unit 11, the second determination unit 12, and the operation control unit 13 as functional blocks.

The aforementioned functional blocks of the control unit 10 are able to be achieved by, for example, a CPU (central processing unit) or the like reading and performing, in a not-illustrated RAM (random access memory) or the like, a program stored in a storage device (storage unit 110) realized by a ROM (read only memory), a NVRAM (non-Volatile random access memory), or the like.

The operation control unit 13 controls an operation state of the air-cleaning function by using determination results of the first determination unit 11 and the second determination unit 12 described later. Specifically, the operation control unit 13 controls at least the following (1) to (3): (I) an air blow volume of the fan 2, (2) display of the di play unit 4, and (3) the sensitivity level of the dust sensor 33 and the odor sensor 34.

When the first determination unit 11 determines that the state is the state Sp3, the operation control unit 13 (1) increases the air blow volume of the fan 2 and (2) makes the sensor sensitivity level of the dust sensor 33 and the odor sensor 34 high.

When the first determination unit 11 determines that the state is the state Sp1, the operation control unit 13 suppresses brightness or turns off light of the display unit 4.

When the second determination unit 12 determines that the state is the state SL2, the operation control unit 13 reduces the air blow volume of the fan 2 and quietly cleans air in the air-cleaning target room R. This is because it is considered that the air-cleaning device 100 is used in a quiet environment, for example, where a person is sleeping. When the second determination unit 12 determines that the state is the state Sp1 and determines that the state is the state SL2, however, the operation control unit 13 increases the air blow volume of the fan 2.

Note that, when it is determined that the state is the state SL2 and determined that the state is the state Sp3, whether to prioritize an operation of the state SL2 or the state Sp3 is able to be appropriately set. Further, when the air-cleaning device 100 starts up, the operation control unit 13 starts the operation by determining that the state is the state Sp2.

(About Determination of "Absence/Small Amount of Motion/Large Amount of Motion")

Determination of "absence/small amount of motion/large amount of motion" will be described with reference to FIGS. 1 and 4. FIG. 4 is a view in which conditions under which the air-cleaning device 100 determines each of states in the air-cleaning target room R are sorted.

By referring to the first determination table 120 described later, the first determination unit 11 determines whether the state is at least any of the state Sp1, the state Sp2, and the state Sp3. The first determination unit 11 performs determination for the three states and outputs a determination result to the operation control unit 13. The first determination unit 11 includes an output value acquisition unit 111, a motion degree determination unit 112, a non-detection time measurement unit 113, and a presence/absence determination unit 114.

The output value acquisition unit 111 acquires an output value (person detection of "presence"/person detection of "absence") from the person detection sensor 31, for example, every predetermined time. The acquired output value is held in a memory or the like for at least a period corresponding to a determination time described later. Note that, hereinafter, acquisition of the output value of the person detection of "presence" or the person detection of "absence" from the person detection sensor 31 by the output value acquisition unit 111 is also represented as detection of the person detection of "presence" or the person detection of "absence".

The motion degree determination unit 112 calculates a total time Ts of the person detection of "presence" in a most recent determination time by referring to the output value acquired by the output value acquisition unit 111 and held, and determines a motion degree of a person on the basis of the total time Ts.

The motion degree determination unit 112 determines the motion degree of the person by using different determination times between a case where the state is the state Sp2 and the state SL1 and a case where the state is the state Sp2 and the state SL2.

Specifically, the determination time (hereinafter, represented as a first determination time for bright time) in the case where the state is the state Sp2 and the state SL1 is shorter than the determination time (hereinafter, represented as a first determination time for dark time) in the case where the state is the state Sp2 and the state SL2. For example, the first determination time for bright time is "1 minute" and the first determination time for dark time is "5 minutes".

The motion degree determination unit 112 obtains the number of times of acquisition of the person detection of "presence" from output values for a time corresponding to the most recent determination time and multiplies a cycle time second which is an acquisition cycle is by the obtained number of times of acquisition to calculate the total time Ts. For example, when the cycle time is 0.1 second and the number of times of acquisition of the person detection of "presence" in the time corresponding to the most recent determination time is 500 times, the total time Ts is 50 seconds obtained by 500 times×0.1 second.

The motion degree determination unit 112 compares the total time Ts of the person detection of "presence" in the determination time to a threshold time and determines the motion degree of the person (that is, whether an amount of motion of the person is large or small).

The motion degree determination unit 112 determines the motion degree of the person by using different threshold times between the case where the state is the state Sp2 and the state SL1 and the case where the state is the state Sp2 and the state SL2.

Specifically, the threshold time (hereinafter, represented as a first threshold time for bright time) in the case where the state is the state Sp2 and the state SL1 is shorter than the threshold time (hereinafter, represented as a first threshold time for dark time) in the case where the state is the state Sp2 and the state SL2. For example, the first threshold time for bright time is "25 seconds" and the first threshold time for dark time is "30 seconds".

That is, in the case where the state is the state Sp2 and the state SL1, the motion degree determination unit 112 performs the following comparison. The motion degree determination unit 112 compares the total time Ts of the person detection of "presence" in most recent "1 minute (first determination time for bright time)" to "25 seconds (first threshold time for bright time)". When the total time Ts of the person detection of "presence" is 25 seconds or more, the motion degree determination unit 112 determines that the state shifts from the state Sp2 to the state Sp3, and when the total time of the person detection of "presence" is less than 25 seconds, the motion degree determination unit 112 determines that the state remains in the state Sp2.

In the case where the state is the state Sp2 and the state SL2, the motion degree determination unit 112 performs the following comparison. The motion degree determination unit 112 compares the total time Ts of the person detection of "presence" in most recent "5 minutes (first determination time for dark time)" to "30 seconds (first threshold time for dark time)", When the total time Ts of the person detection of "presence" is 30 seconds or more, the motion degree determination unit 112 determines that the state shifts from the state Sp2 to the state Sp3, and when the total time of the person detection of "presence" is less than 30 seconds, the motion degree determination unit 112 determines that the state remains in the state Sp2.

Further, the motion degree determination unit 112 determines the motion degree of the person by using the same determination time in a case where the state is the Sp3 and the state SL1 and a case where the state is the state Sp3 and the state SL2.

Specifically, the determination time (hereinafter, represented as a second determination time for bright time) in the case where the state is the state Sp3 and the state SL1 is the same as the determination time (hereinafter, represented as a second determination time for dark time) in the case where the state is the state Sp3 and the state SL2. For example, the second determination time for bright time and the second determination time for dark time when the state is the state Sp3 are "5 minutes".

The motion degree determination unit 112 compares the total time Ts of the person detection of "presence" in the determination time to a threshold time and determines the motion degree of the person.

The motion degree determination unit 112 determines the motion degree of the person by using the same threshold time in the case where the state is the state Sp3 and the state SL1 and the case where the state is the state Sp3 and the state SL2.

Specifically, the threshold time (hereinafter, a second threshold time for bright time) in the case where the state is the state Sp3 and the state SL1 is the same as the threshold time (hereinafter, represented as a second threshold time for dark time) in the case where the state is the state Sp3 and the state SL2. For example, the second threshold time for bright time and the second threshold time for dark time are "30 seconds".

That is, in the case where the state is the state Sp3 and the state SL1, the motion degree determination unit 112 performs the following comparison. The motion degree determination unit 112 compares the total time Ts of the person detection of "presence" in most recent "5 minutes (second determination time for bright time)" to "30 seconds (second threshold time for bright time)". When the total time Ts of the person detection of "presence" is less than 30 seconds, the motion degree determination unit 112 determines that the state shifts from the state Sp3 to the state Sp2, and when the total time of the person detection of "presence" is 30 seconds or more, the motion degree determination unit 112 determines that the state remains in the state Sp3.

In the case where the state is the state Sp3 and the state SL2, the motion degree determination unit 112 performs the following comparison. The motion degree determination unit 112 compares the total time Ts of the person detection of "presence" in most recent "5 minutes (second determination time for dark time)" to "30 seconds (second threshold time for dark time)". When the total time Ts of the person detection of "presence" is less than 30 seconds, the motion degree determination unit 112 determines that the state shifts from the state Sp3 to the state Sp2, and when the total time of the person detection of "presence" is 30 seconds or more, the motion degree determination unit 112 determines that the state remains in the state Sp3.

The determination of the motion degree of the person by the motion degree determination unit 112 is performed every 1 minute. Further, when the state shifts from the state Sp2 to the state Sp3, the determination of the motion degree of the person is not performed for a predetermined standby time (for example, 5 minutes) and the operation of the air-cleaning device 100 in the state Sp3 is performed for the predetermined standby time. Further, in the state SL2, also when the state shifts from the state Sp3 no the state Sp2, the determination of the motion degree of the person is not performed for a predetermined standby time (for example, 5 minutes) and the operation of the air-cleaning device 100 in the state Sp2 is performed for the predetermined standby time.

By referring to the output value acquired by the output value acquisition unit 111 and held, the non-detection time measurement unit 113 calculates a non-detection time (non-detection period) in which the person detection of "presence" is not detected continuously after the person detection of "presence" is detected last.

The presence/absence determination unit 114 determines that a person is not present (a person is absent) when the non-detection time measured by the non-detection time measurement unit 113 reaches a duration time.

The presence/absence determination unit 114 determines presence/absence of the person by using different duration times between the case where the state is the state Sp2 and the state SL1 and the case where the state is the state Sp2 and the state SL2.

Specifically, the duration time (hereinafter, represented as a duration time for bright time) in the case where the state is the state Sp2 and the state SL1 is shorter than the duration time (hereinafter, represented as a duration time for dark time) in the case where the state is the state Sp2 and the state SL2. For example, the duration time for bright time is "15 minutes" and the duration time for dark time is "1 hour".

That is, in the case where the state is the state Sp2 and the state SL1, the presence/absence determination unit 114 performs the following determination. When the non-detection time has lapsed "15 minutes (duration time for bright time)" or more, the presence/absence determination unit 114 determines the state shifts from the state Sp2 to the state Sp1. When the non-detection time is "less than. 15 minutes", the presence/absence determination unit 114 determines that "the state remains in the state Sp2".

In the case where the state is the state Sp2 and the state SL2, the presence/absence determination unit 114 performs the following determination. When the non-detection time has lapsed "1 hour (duration time for dark time)" or more, the presence/absence determination unit 114 determines that the state shifts from the state Sp2 to the state Sp1. When the non-detection time is less than. 1 hour, the presence/absence determination unit 114 determines that the state remains in the state Sp2.

Further, when the output value acquisition unit 111 detects the person detection of "presence", the presence/absence determination unit 114 determines that there is a person (a person is present). In the case of the state Sp1, regardless of whether the state is the state SL1 or the state SL2, when the output value acquisition unit 111 detects the person detection of "presence", the presence/absence determination unit 114 immediately determines that the state shifts from the state Sp1 to the state Sp2.

(Summary of Shift to Each of States of "Absence/Small Amount of Motion/Large Amount of Motion")

As illustrated in FIG. 4, a condition used for the air-cleaning device 100 to determine "whether the state is any of the state Sp1, the state Sp2, and the state Sp3" varies depending on "whether the state is determined to be the state SL1 or the state SL2". A condition used for the air-cleaning device 100 to determine that the state shifts "from the state Sp1 to the state Sp2", "from the state Sp2 to the state Sp1", "from the state Sp2 to the state Sp3", or "from the state Sp3 to the state Sp2" also varies. Conditions for the shift are summarized as follows.

In a case where the state is determined to be the state SL1 in which it is bright inside the air-cleaning target room R and the state is determined "to be the state Sp1" until just recently (A), when a condition of the person detection of "presence" is satisfied, the air-cleaning device 100 determines that "there is a state shift to the state Sp2".

In a case where the state is determined to be the state SL1 and the state is determined "to be the state Sp2" until just recently (B), when a condition that the person detection of "absence" continues for the duration time for bright time is satisfied, the air-cleaning device 100 determines that "there is a state shift to the state Sp1". Here, the duration time for bright time is 15 minutes in the example of FIG. 4.

In a case where the state is determined to be the state SL1 and the state is determined "to be the state Sp2" until just recently (B), when a condition that the total time Ts of the person detection of "presence" in the most recent first determination time for bright time is equal to or more than the first threshold time for bright time is satisfied, the air-cleaning device 100 determines that. "there is a state shift to the state Sp3". Here, the first determination time for bright time is 1 minute and the first threshold time for bright time is 25 seconds in the example of FIG. 4.

In a case where the state is determined to be the state SL1 and the state is determined "to be the state Sp3" until just recently (C), when a condition that the total time Ts of the person detection of "presence" in the most recent second determination time for bright time is less than the second threshold time for bright time is satisfied, the air-cleaning device 100 determines that "there is a state shift to the state Sp2". Here, the second determination time for bright time is 5 minutes and the second threshold time for bright time is 30 seconds in the example of FIG. 4.

In a case where the state is determined to be the state SL2 in which it is dark inside the air-cleaning target room R and the state is determined "to be the state Sp1" until just recently (D), when a condition of the person detection of "presence" is satisfied, the air-cleaning device 100 determines that "there is a state shift to the state Sp2".

In a case where the state is determined to be the state SL2 and the state is determined "to be the state Sp2" until just recently (E), when a condition that the person detection of "absence" continues for the duration time for dark time is satisfied, the air-cleaning device 100 determines that "there is a state shift to the state Sp1". Here, the duration time for dark time is 1 hour in the example of FIG. 4.

In a case where the state is determined to be the state SL2 and the state is determined "to be the state Sp2" until just recently (E), when a condition that the total time Ts of the person, detection of "presence" in the most recent first determination time for dark time is equal to or more than the first threshold time for dark time is satisfied, the air-cleaning device 100 determines that "there is a state shift to the state Sp3". Here, the first determination time for dark time is 5 minutes and the first threshold time for dark time is 30 seconds in the example of FIG. 4.

In a case where the state is determined to be the state SL2 and the state is determined "to be the state Sp3" until just recently (F), when a condition that the total time Ts of the person detection of "presence" in the last second determination time for dark time is less than the second threshold time for dark time is satisfied, the air-cleaning device 100 determines that "there is a state shift to the state Sp2". Here, the second determination time for dark time is 3 minutes and the second threshold time for dark time is 30 seconds in the example of FIG. 4.

The first determination time for bright time is shorter than the first determination time for dark time. For example, while the first determination time for bright time is "1 minute", the first determination time for dark time is "5 minutes". Thus, in the case where the state is determined to be the state SL1, when the motion amount of the person increases (that is, when the state shifts from the state Sp2 to the state Sp3), the air-cleaning device 100 is able to clean air more quickly than in the case of the state SL2.

Further, when the state shifts to the state Sp3 once, the air-cleaning device 100 stops determination of the state of the air-cleaning device 100 for immediate 5 minutes so that the state does not immediately returns to the state Sp2. In the state SL2, when the state shifts to the state Sp2 once, the air-cleaning device 100 stops determination of the state of the air-cleaning device 100 for immediate 5 minutes so that the state does not immediately returns to the state Sp1 or the state Sp3.

(About Determination of "Bright/Dark Inside Room")

By referring to the second determination table 130, the second determination unit 12 determines whether the state is at least any of the state SL1 in which it is bright inside the air-cleaning target room R and the state SL2 in which it is dark inside the air-cleaning target rom R from a detection signal from the illuminance sensor 32.

Specifically, the second determination unit 12 compares illuminance in the air-cleaning target room R, which is detected by the illuminance sensor 32, to predetermined illuminance. When the illuminance in the air-cleaning target room R, which is detected by the illuminance sensor 32, is equal to or more than the predetermined illuminance, the second determination unit 12 determines that the state is the state SL1 in which it is bright inside the air-cleaning target room R. When the illuminance in the air-cleaning target room. R, which is detected by the illuminance sensor 32, is less than the predetermined illuminance, the second determination unit 12 determines that the state is the state SL2 in which it is dark inside the air-cleaning target room R.

Embodiment 2

Figure 5:
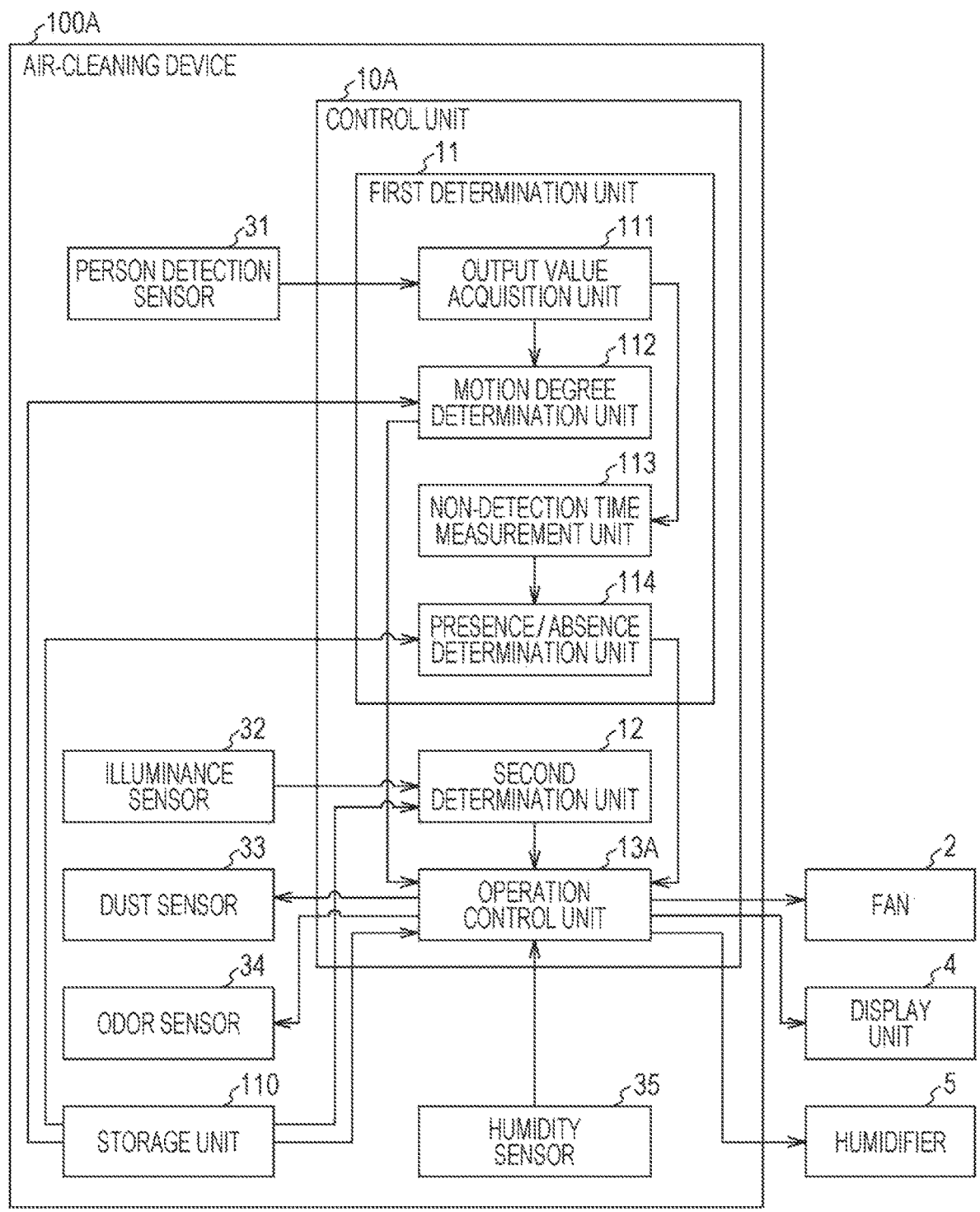
FIG. 5 is a functional block diagram illustrating a schematic configuration of an air-cleaning device according to Embodiment 2 of the invention.

Another embodiment of the invention will be described as follows with reference to FIGS. 3, 5, and 6. Note that, for convenience of description, a member having the same function as that of the member described in the aforementioned embodiment will be given the same reference sign and description thereof will be omitted. FIG. 5 is a functional block diagram illustrating a schematic configuration of an air-cleaning device 100 according to Embodiment 2 of the invention. FIG. 6 is a view in which operation control in each of states in the air-cleaning target room R of the air-cleaning device 100A is sorted. The air-cleaning device 100A is different from the air-cleaning device 100 in terms of including a control unit 10A instead of the control unit 10 and including a humidifier 5 and a humidity sensor 35, but is similar to the air-cleaning device 100 in other configurations.

The humidifier 5 is arranged between the fan 2 and the air-cleaning filter 7 as illustrated in FIG. 3. The humidifier 5 is able to use, for example, a rotationally driven humidification filter. In this case, the humidification filter is rotatably supported by a tray filled with water. When the humidification filter is rotationally driven by a motor which is driving means of the humidification filter, a part of the humidification filter is immersed into the water in the tray so that the humidification filter contains water. Thus, when indoor air taken into the main body 1 through the inlet 6 by the fan 2 passes through the humidification filter, the water is able to be vaporized from the humidification filter so that the indoor air that is taken contains moisture. The air containing the moisture is supplied into the room through the outlet 20 and the air in the air-cleaning target room R is humidified. An operation of the humidifier 5 stops when reaching a target humidity.

The humidity sensor 35 detects the humidity in the air-cleaning target room R. The humidity sensor 35 is arranged, for example, in the front surface of the main body 1.

The control unit 10A is different from the control unit 10 in terms of including an operation control unit 13A instead of the operation control unit 13 as illustrated in FIG. 5, but is similar to the control unit 10 in other configurations.

By using determination results of the first determination unit 11 and the second determination unit 12 and a detection result of the humidity sensor 35, the operation control unit 13A performs control of the operation of the air-cleaning function described below in addition to the control of the operation state in Embodiment 1.

Specifically, as illustrated in FIG. 6, when the first determination unit 11 determines that the state is the state Sp3, the operation control unit 13A performs the following control (1) to (3): (1) set the sensor sensitivity level of at least one of the dust sensor 33 and the odor sensor 34 to "high", (2) turn on the humidifier 5, and (3) increase the air blow volume of the fan 2.

When the first determination unit 11 determines that the state is the state Sp2, the operation control unit 13A performs control to turn on the humidifier 5 and increase the air blow volume of the fan 2. Control of set contents is continuously performed for the dust sensor 33 and the odor sensor 34.

When the first determination unit 11 determines that the state is the state Sp2, the operation control unit 13A performs control to (1) turn off the humidifier 5 and (2) increase the air blow volume. Control of set contents is continuously performed for the dust sensor 33 and the odor sensor 34.

In a case where the humidity sensor 35 detects that the humidity in the air-cleaning target room R reaches a target humidity and the operation control unit 13A stops the humidifier 5, the operation control unit 13A controls the air volume of the fan 2 in five levels (highest, high, middle, low, and lowest) in the case of the state SL1 and controls the air volume of the fan 2 in four levels (high, middle, low, and lowest) in the case of the state SL2.

Further, in a where the humidity sensor 35 detects that a difference between the humidity in the air-cleaning target room R and the target humidity is less than 10%, the operation control unit 13A controls the air volume of: the fan 2 in four levels (highest, high, middle, and low) in the case of the state SL1 and controls the air volume of the fan 2 in three levels (high, middle, and low) in the case of the state SL2.

In a case where the humidity sensor 35 detects that the difference between the humidity in the air-cleaning target room R and the target humidity is 10% or more, the operation control unit 13A controls the air volume of the fan. 2 in one level (highest) in the case of the state SL1 and controls the air volume of the fan. 2 in one level (high) in the case of the state SL2.

Embodiment 3

Figure 7:
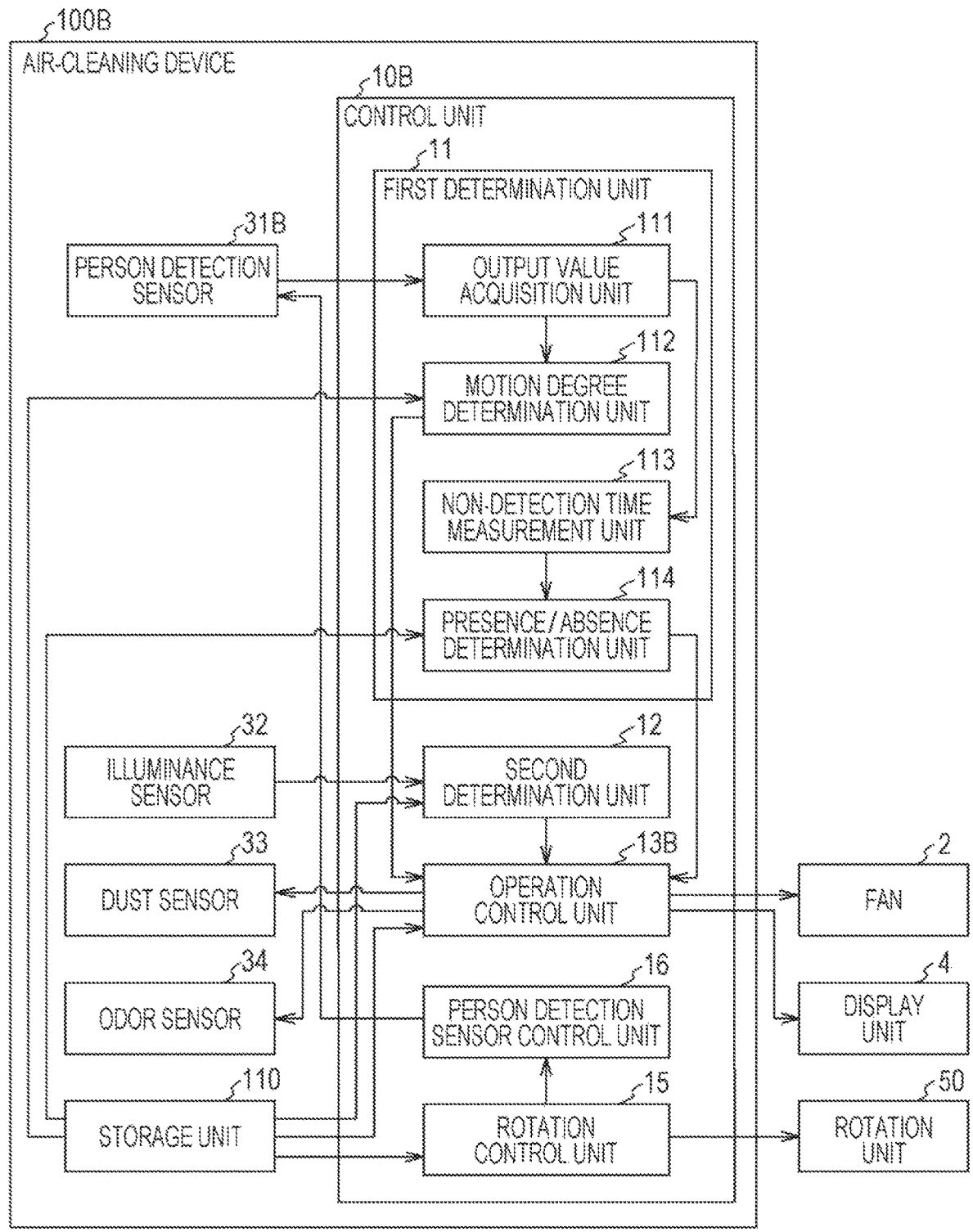
FIG. 7 is a functional block diagram illustrating a schematic configuration of an air-cleaning device according to Embodiment 3 of the invention.
Figure 8:
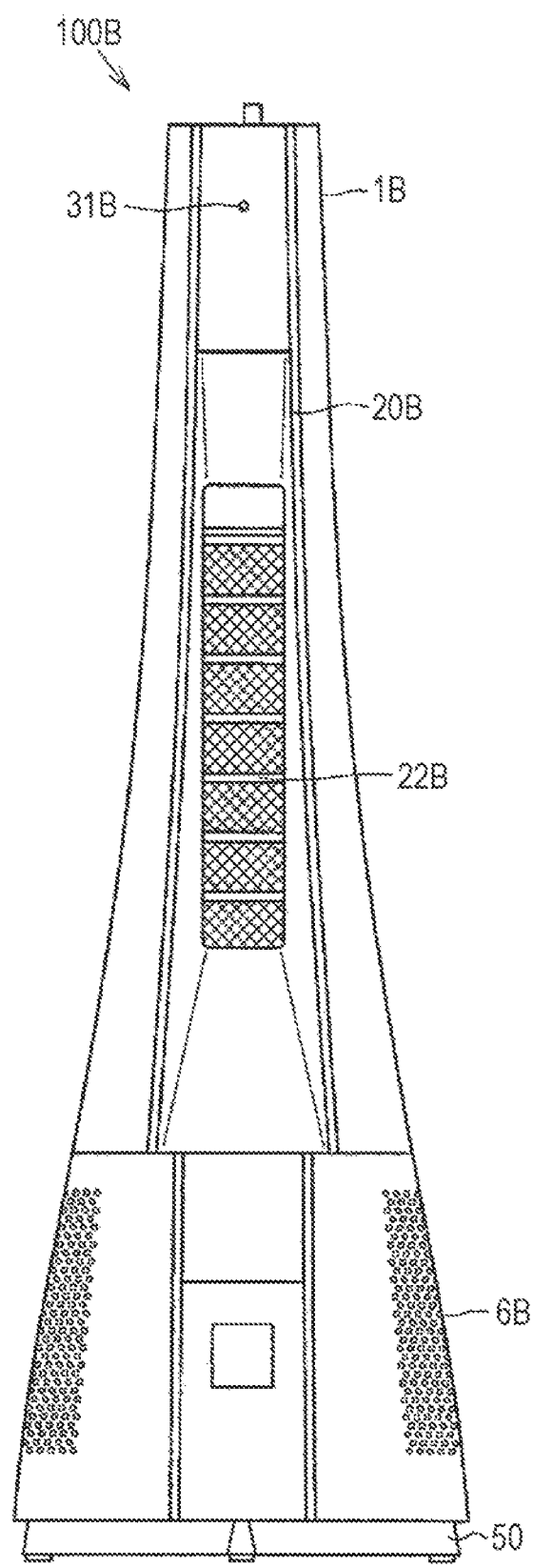
FIG. 8 is a front view illustrating an outline of the air-cleaning device.
Figure 9:
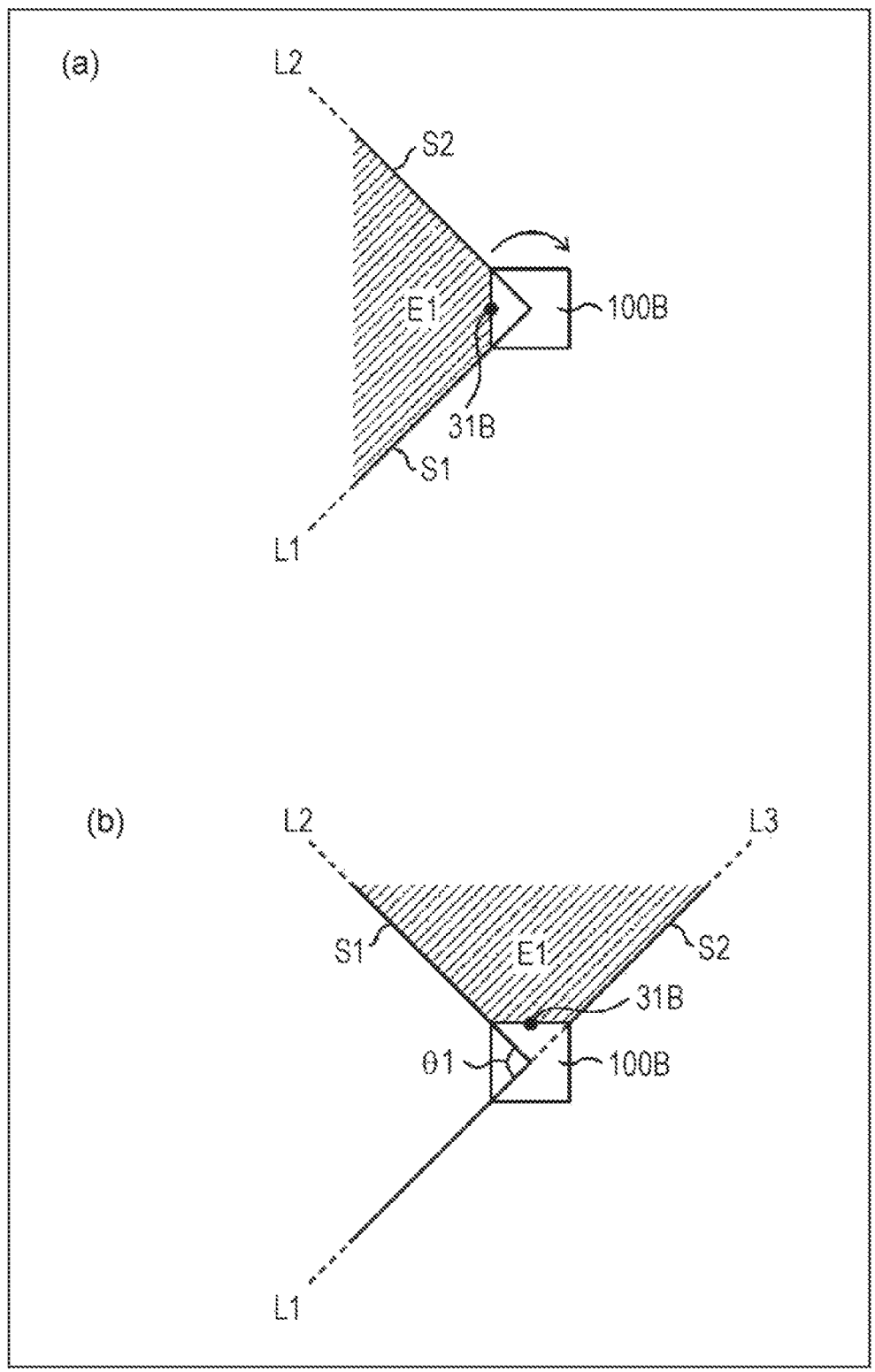
FIGS. 9(*a*) and 9(*b*) illustrate a relationship between a rotation angle of a part of the air-cleaning device and a detection range of a person detection sensor.

Another embodiment of the invention will be described as follows with reference to FIGS. 7 to 9. Note that, for convenience of description, a member having the same function as that of the member described in the aforementioned embodiment will be given the same reference sign and description thereof will be omitted. FIG. 7 is a functional block diagram illustrating a schematic configuration of an air-cleaning device 100B according to Embodiment 3 of the invention. FIG. 8 is a front view illustrating an outline of the air-cleaning device 100B. The air-cleaning device 100B is different from the air-cleaning device 100 in terms of including a control unit 10B instead of the control unit 10 and including a base 50 and in an appearance, but is similar to the air-cleaning device 100 in other configurations.

A configuration of the air-cleaning device 100B will be described with reference to FIGS. 7 and 8. The air-cleaning device 100B illustrated in FIGS. 7 and 8 has a configuration including a main body 1B, the fan 2, the display unit 4, an inlet 6B, the air-cleaning filter 7, the control unit 10B, an outlet 20B, a person detection sensor 31B, the illuminance sensor 32, the dust sensor 33, the odor sensor 34, and the base 50. Note that, for simplification in the description, a component that is not directly relevant to the present embodiment is omitted in the description and figures. However, the air-cleaning device 100B may include such an omitted component in accordance with actual condition of implementation.

The inlet 6B is positioned in a lower part on a side surface of the main body and used to suck air into an inside. The air-cleaning filter 7 that removes dust from the air to be sucked is provided on a main body 1B side of the inlet 6B.

The outlet 21B is arranged on a front surface of the main body 1B and used to blow out cleaned air. The outlet 21B is provided with a louver 22B that changes a direction of air.

The person detection sensor 31B detects motion of a person in the air-cleaning target room R. The person detection sensor 31B is constituted by a pyroelectric sensor. On and off (driving and stop of driving) of the person detection sensor 31B are controlled by a person detection sensor control unit 16.

The base 50 rotates the main body IN that is a part of the air-cleaning device 100B (section of the air-cleaning device 100B), in which the person detection sensor 31B is provided, around a rotational shaft extending in a vertical direction.

Specifically, the main body 1B is installed on a top surface of the base 50 that is circular in plan view so that the base 50 supports the main body IN. The base 50 includes a displacement motor (not illustrated), and by driving the displacement motor, the base 50 is able to rotate the main body 1B with respect to the base 50 around a rotational shaft line provided in a center of the base 50 in a radial direction and extending in the vertical direction. The driving of the base 50 is controlled by a rotation control unit 15 described later.

(Control Unit)

The control unit 10B is different from the control unit 10 in terms of including an operation control unit 13B instead of the operation control unit 13 and in terms of further including the rotation control unit 15 and the person detection sensor control unit 16, but is similar to the control unit 10 in other configurations.

The rotation control unit 15 controls driving of the base 50. The rotation control unit 15 intermittently operates driving of the base 50. Specifically, the rotation control unit 15 drives the base 50 so that the main body 1B is reciprocally displaced (performs swinging operation) while stopping for a predetermined time every rotation by a predetermined angle.

In accordance with a detection range of the person detection sensor 31B, the rotation control unit 15 decides the rotation angle of the main body 1B at the time of driving the base 50. A relationship between the rotation angle of the main body 1B and the detection range of the person detection sensor 31B will be specifically described later.

The person detection sensor control unit 16 controls on/off of the person detection sensor 31B. Specifically, the person detection sensor control unit 16 turns off (stops driving of) the person detection sensor 31B while the base 50 is driven and turns on (drives) the person detection sensor 31B while the driving of the base 50 is stopped.

Here, the person detection sensor 31B determines the person detection of "presence"/"absence" in accordance with presence or absence of movement of a heat source, so that when the main body 1B itself mounted with the person detection sensor 31B swings, the person detection sensor 31B erroneously performs determination as the person detection of "presence" even though the heat source itself does not move. In the present embodiment, however, since the person detection sensor 31B is turned off while the main body 1B including the person detection sensor 31B rotates, it is possible to avoid a case where the person detection sensor 31B erroneously performs determination as the person detection of "presence" even though the heat source itself does not move.

(Rotation Angle of Main Body and Detection Range of Person Detection Sensor)

The relationship between the rotation angle of the main body 1B and the detection range of the person detection sensor 31B will be specifically described with reference to FIGS. 9(a) and 9(b). FIGS. 9(a) and 9(b) illustrate the relationship between the rotation angle of the main body 1B and the detection range of the person detection sensor 31B.

First, a case where the main body 1B stops (driving of the base 50 stops) so that a surface where the person detection sensor 31B is installed faces a left side in a paper surface as illustrated in FIG. 9(a) will be described. Since the main body 1B stops, the person detection sensor 31B is turned on. The detection range of the person detection sensor 31B at this time is an area E1 from a start line S1 to an end line S2.

At this time, a line overlapped with the start line S1 is set as a line L1 and a line overlapped with the end line S2 is set as a line L2.

Next, when the main body 1B starts to rotate in a direction of an arrow, the person detection sensor 31B is turned off. After that, as illustrated in FIG. 9(b), the main body 1B rotates by an angle θ1 to a position, at which the start line S1 is overlapped with the line L2 and the end line S2 is overlapped with a line L3, and stops. At this time, when the main body 1B rotates to a position at which the start line S1 exceeds the line L2, a range where person detection is not allowed is generated in a range from the line L2 to the start line S1. Thus, it is desired that the angle θ1 is decided so that the start line S1 fails within a range of the area E1. Thereby, there is no omission of a range where a person is detected.

Note that, the person detection sensor 31B performs person detection at each place where the main body 1B rotates and stops, so that the person detection is able to be performed in a wider range than a case where person detection is performed in a state where a person detection sensor is constantly fixed.

Note that, in Embodiment 3, the air-cleaning device 100B may function as an air blower that does not include the air-cleaning filter 7b, the illuminance sensor 32, the dust sensor 33, or the odor sensor 34 and includes the person detection sensor 31B.

Embodiment 4

Another embodiment of the invention will be described as follows. Note that, for convenience of description, a member having the same function as that of the member described in the aforementioned embodiment will be given the same reference sign and description thereof will be omitted.

The air-cleaning device described in each of Embodiments 1 to 3 described above automatically changes an operation content depending on various sensors. In the present embodiment, an air-cleaning device that has a function of outputting sound to notify a user when changing the operation content, that is, a speech function of producing a speech content associated with a device state indicating a state of the air-cleaning device will be described.

(Outline of Air-Cleaning Device)

Figure 10:
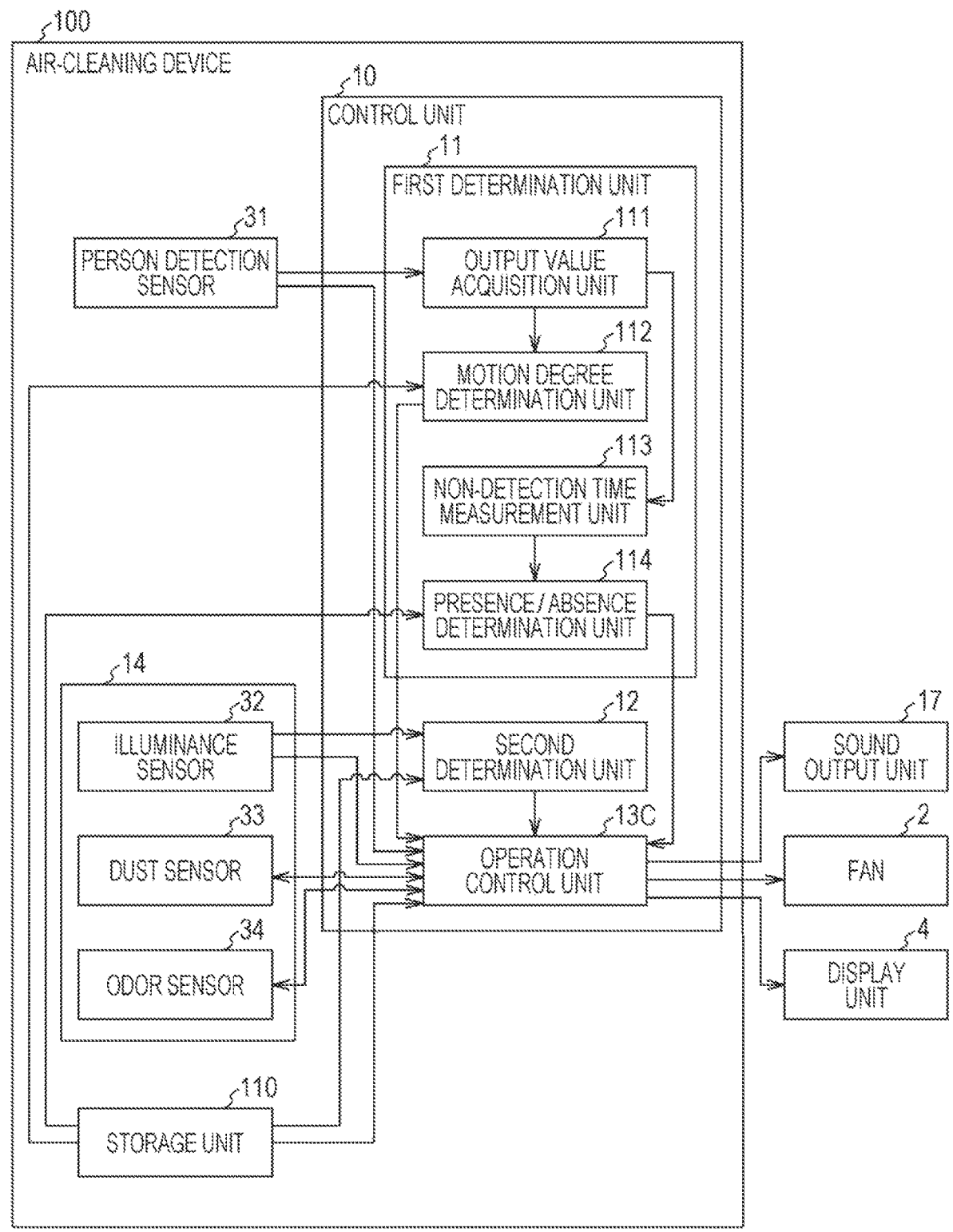
FIG. 10 is a functional block diagram illustrating a schematic configuration of an air-cleaning device according to Embodiment 4 of the invention.

FIG. 10 is a functional block diagram illustrating a schematic configuration of an air-cleaning device 1000 according to the present embodiment. The air-cleaning device 100C is different from the air-cleaning device 100 in terms of including a sound output unit 17 for speech, but is similar to the air-cleaning device 100 in other configurations. The sound output unit 17 is a sound output device such as a speaker. An operation control unit 130 outputs, from the sound output unit 17, sound based on sound data stored in the storage unit 110. Note that, in the present embodiment, for convenience of description, when the person detection sensor 31, the illuminance sensor 32, the dust sensor 33, and the odor sensor 34 are collectively referred, they are referred to as a sensor unit (device state detection unit) 14.

(Speech Function)

Figure 11:
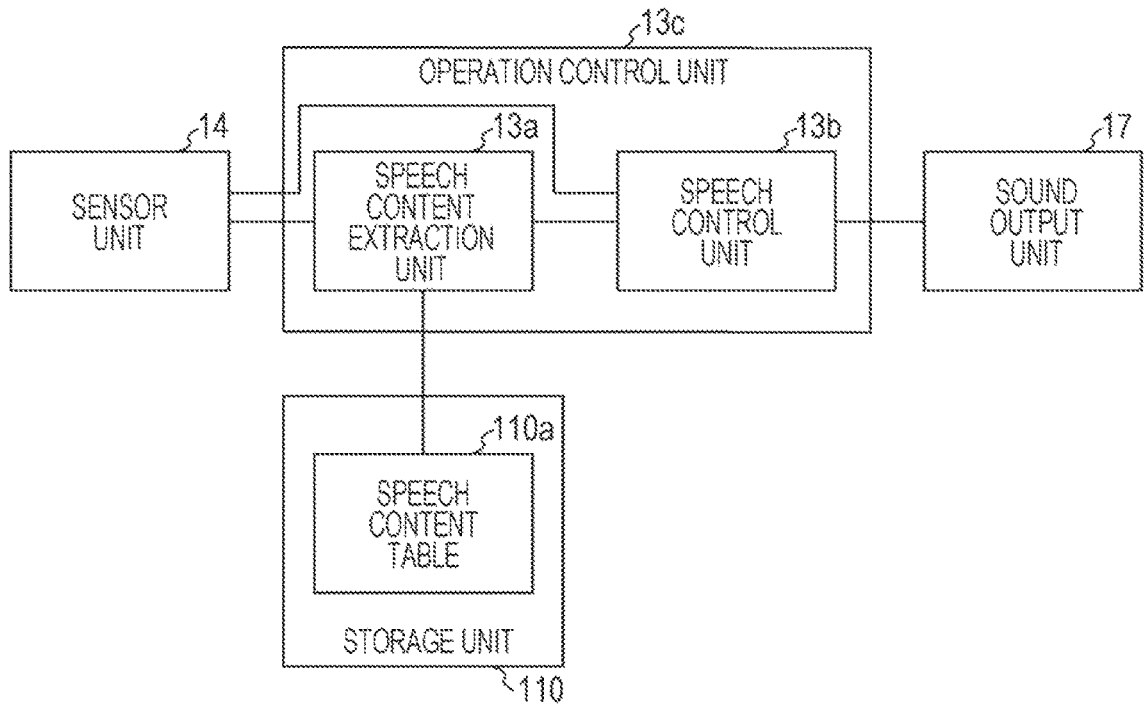
FIG. 11 is a block diagram illustrating a schematic configuration of a control unit of the air-cleaning device illustrated in FIG. 10.

FIG. 11 is a block diagram illustrating a schematic configuration of the operation control unit 130 and the storage unit 110 for achieving the speech function in the air-cleaning device 1000. As illustrated in FIG. 11, the operation control unit 130 includes a speech content extraction unit 13a and a speech control unit 13b. The storage unit 110 includes a speech content table 110a.

The speech content table 110a includes a speech content in association with a speech condition. In the speech content table 110a, a plurality of speech contents produced by the air-cleaning device 1000 are stored for each of categories. Here, the categories are classified into air contamination, information, sleep, watch, guidance, temperature/humidity change, and the like that indicate a device state. The speech content is associated with the device state (speech condition) indicating a state of the air-cleaning device 1000. Further, a priority is given to each of the categories and a priority is also given to the speech content in the category. Note that, details of the speech content table 110a be described later.

The speech content extraction unit 13a extracts, from the speech content table 110a of the storage unit 110, a speech content associated with device data (detection signal) indicating a device state sensed (detected) by the sensor unit 14 and transmits the extracted speech content to the speech control unit 13b.

The speech control unit 13b causes the sound output unit 17 to produce the speech content, which is extracted by the speech content extraction unit 13a, in descending order of the priority given to the category that includes the speech content. Speech processing thereof will be described below.

(Summary of Speech Processing)

Meanwhile, an inappropriate scene is also assumed when a speech content associated with a device state indicating a state of the air-cleaning device is produced. For example, considered is, for example, a case where the air-cleaning device produces speech while a user is sleeping and sleeping is disturbed. Speech in a room where there is no user near the air-cleaning device is also performed without notice.

Thus, it is considered that, by determining whether the user is sleeping by using the illuminance sensor 32 included in the sensor unit 14 illustrated in FIG. 10 and determining whether the user is near the air-cleaning device by using the person detection sensor 31, speech is allowed when the user is near the air-cleaning device and is not sleeping.

Figure 12:
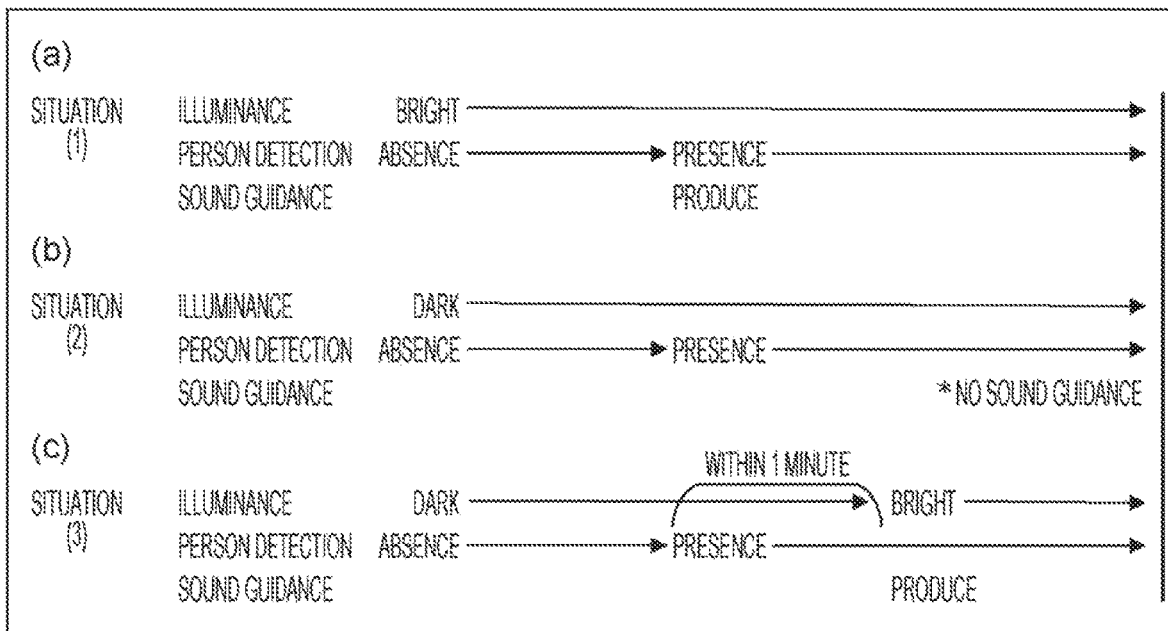
FIG. 12 illustrates a situation of timing of speech in the air-cleaning device illustrated in FIG. 10.

FIG. 12 illustrates timing (speech trigger) of speech in accordance with situations (situation (1) to situation. (3)) around a place where the air-cleaning device 100C is installed. In FIG. 12, the illuminance of "bright" indicates a case where the illuminance sensor 32 detects that brightness in the room is equal to or more than predetermined brightness and the illuminance of "dark" indicates a case where the illuminance sensor 32 detects that darkness in the room is equal to or more than predetermined darkness. Further, the person detection of "absence" indicates a case where the person detection sensor 31 does not detect a person in the room and the person detection of "presence" indicates a case where the person detection sensor 31 detects a person in the room.

In a case of the situation (1) illustrated in FIG. 12(a), since the room is bright, the user is assumed to act, so that sound guidance is immediately performed.

In a case of the situation (2) illustrated in FIG. 12(b), since the room is dark, the user is assumed to be sleeping, so that sound guidance is not performed.

In a case of the situation (3) illustrated in FIG. 12(c), it is assumed that the user returns to the dark room and turns on a light, so that sound guidance is performed when the illuminance becomes bright.

Control of the sound guidance is performed by the speech control unit 13b in the operation control unit 13C. That is, a detection signal from the sensor unit 14 is transmitted not only to the speech content extraction unit 13a but also to the speech control unit 13b. Thus, the speech control unit 13b performs control of speech for the sound output unit 17 upon reception of detection signals from the person detection sensor 31 and the illuminance sensor 32.

The speech in the air-cleaning device 1000 is basically performed by speech trigger as illustrated in FIG. 12. A relationship between a type of the speech trigger and a speech category (speech content) corresponding to the speech trigger is as illustrated in FIG. 13.

FIG. 13 is a table indicating a relationship between a speech condition (1), a speech condition (2), a change of a display unit, whether to repeat, and priority order when automatic speech is performed. Here, the automatic speech means not speech produced when a user performs an operation but speech for automatically transmitting a content to be notified by the air-cleaning device 100C to the user in accordance with a sensing result or the like by the sensor unit 14. Note that, the table illustrated in FIG. 13 is stored as the speech content table 110a in the storage unit 110.

(Details of Speech Processing)

Figure 14:
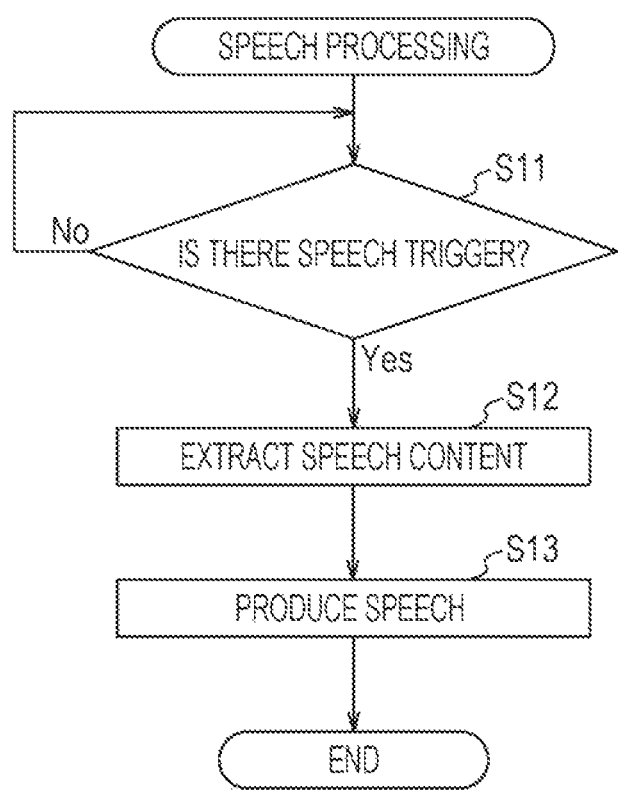
FIG. 14 is a flowchart illustrating a flow of speech processing performed by the control unit illustrated in FIG. 11.

Details of the speech processing in the present embodiment will be described below with reference to FIGS. 13 and 14. FIG. 14 is a flowchart illustrating a flow of the speech processing performed by the operation control unit 130.

First, the speech content extraction unit 13a determines whether or not there is speech trigger as illustrated in FIG. 14 (step S11). Here, the speech content extraction unit 13a determines whether any of the speech trigger illustrated in FIG. 13 starts.

Then, when determining that there is speech trigger (Yes) at step S11, the speech content extraction unit 13a extracts a speech content (step S12). Here, whether the speech trigger is any of the speech trigger described in the table illustrated in FIG. 13 is determined and a speech content included in a speech category associated with the determined speech trigger is extracted. Here, the speech content is specified by any of the speech condition (1) that is the speech trigger and the speech condition (2), which are illustrated in FIG. 13, and the specified speech content is extracted. For example, in a case where the speech category is "information", as illustrated in FIG. 13, when "small amount of motion of person" or "large amount of motion of person" is detected after "absence" of the person detection sensor has continued for 6 hours or more as the speech condition 1 which is the speech trigger, humidification is resumed, and then, the speech content of "You come back, so that humidification starts immediately." is extracted. Further, as the speech condition 2, any of conditions that (1) in a case of "automated" or "feel effect", (2) "small amount of motion of person" or "large amount of motion of person" is detected after "absence" of the person detection sensor continues for 6 hours or more, and then, humidification starts again (3) masking has been performed for 1 minute after an operation starts, (4) when the illuminance is dark, speech is not produced immediately, and then, the illuminance has become bright in 1 minute, and (5) 6 hours have lapsed after the same speech in a previous time is satisfied, the speech content of "You come back. Humidification starts immediately." is produced.

Next, when the speech content is extracted at step S12, the speech control unit 13b causes the sound output unit 17 to produce the extracted speech content (step S13).

(Effect)

In the present embodiment, whether to be a situation where sound guidance is allowed is determined by the air-cleaning device 1005 that includes the person detection sensor 31, the illuminance sensor 32, and the sound output unit 17 and that is able to measure a time. On the basis of the determination, an operation content that changes depending on various sensors is guided by sound.

Thereby, for an operation state that changes depending on the person detection sensor, a situation of the user is determined on the basis of information by the person detection sensor and the illuminance sensor and whether to perform sound guidance is appropriately determined. Accordingly, speech is not produced unexpectedly when the person detection sensor reacts in a dark place, so that there is no possibility of disturbing sleeping of the user.

Modified Example

Figure 15:
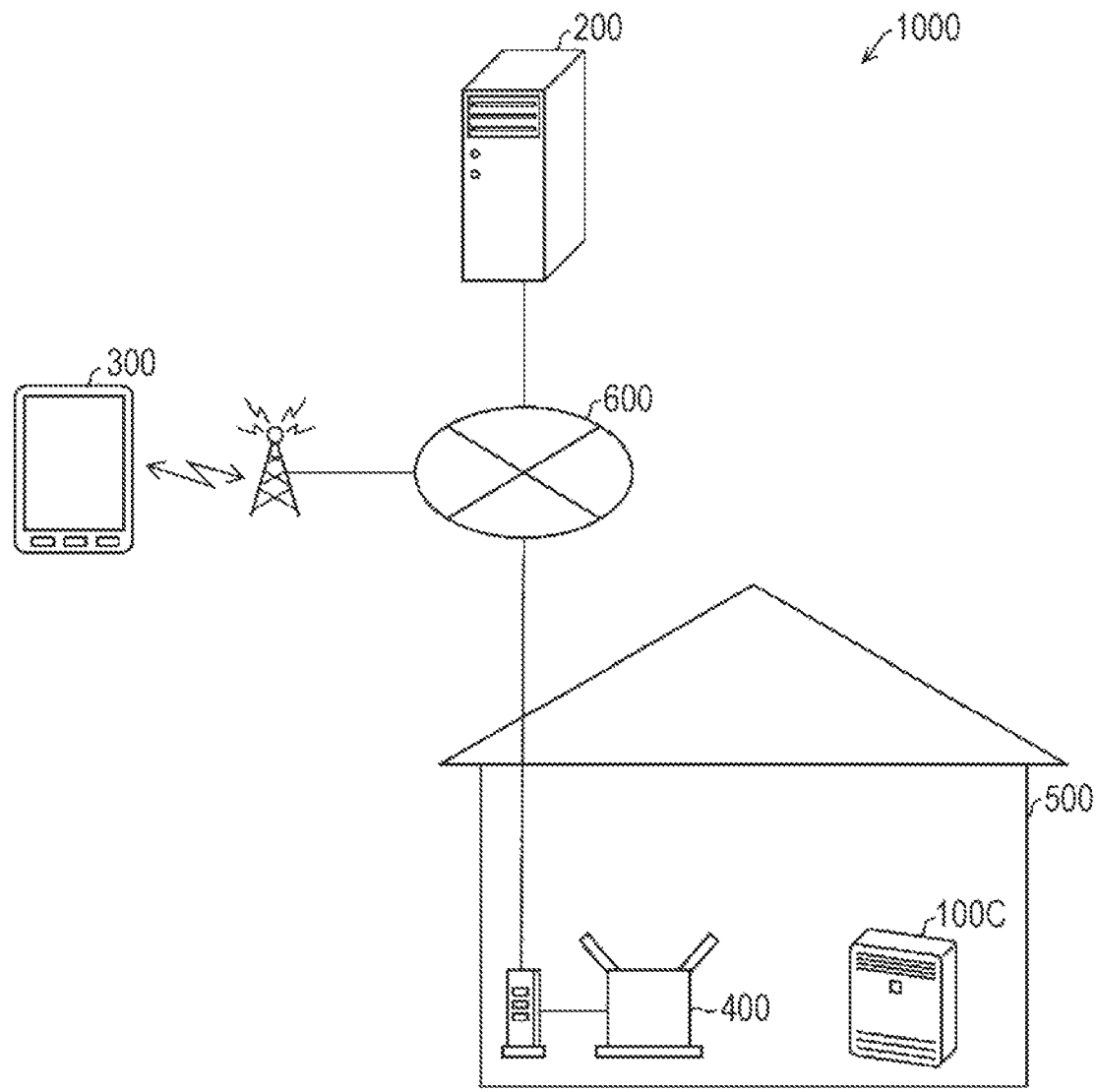
FIG. 15 illustrates an outline of an air-conditioning support system using the air-cleaning device illustrated in FIG. 10.

Though an example in which the speech content table 110a illustrated in FIG. 11 is stored in the storage unit 110 in the air-cleaning device 1000 has been described in Embodiment 4 described above, the speech content stored in the speech content table 110a may be acquired from a cloud server 200 through a wide-area communication network 600 and a relay station 400 as illustrated in FIG. 15.

(Outline of Air-Conditioning Support System)

FIG. 15 illustrates an outline of an air-conditioning support system 1000. As illustrated in FIG. 15, in the air-conditioning support system 1000, the air-cleaning device 1000 installed in a house of the user 500, the cloud server 200, and a mobile terminal 300 are connected through the wide-area communication network 600 (communication network). The air-conditioning support system 1000 supports air-conditioning by which an air state in a room of the house of the user 500 is controlled. Note that, though one air-cleaning device 1000, one cloud server 200, one mobile terminal 300, and one house of the user 500 are exemplified in FIG. 15, the number and a type thereof are not limited thereto.

The air-cleaning device 1000 cleans air in the room of the house of the user 500. In the present embodiment, the air-cleaning device 1000 is a so-called network household appliance that has a wireless communication function of communicating with the cloud server 200 through connection with the wide-area communication network 600. The wireless communication function may be incorporated in the main body of the air-cleaning device 1000 or provided in a communication adapter (not illustrated) that is externally attached to the main body of the air-cleaning device 1000. Note that, though the air-cleaning device 1000 has a humidification function in the present embodiment, but may not have the humidification function. Further, though the air-cleaning device 1000 is installed in the house of the user 500 as illustrated in FIG. 15 in the present embodiment, an installation place is not limited and the air-cleaning device 1000 may be installed in an office or a public place.

The mobile terminal 300 and the air-cleaning device 100C are registered in association with each other in the cloud server 200. The mobile terminal 300 is configured so as to be able to remotely operate, through the cloud server 200, the air-cleaning device 1000 which is registered in association with the mobile terminal 300 in the cloud server 200.

The mobile terminal 300 receives, from the cloud server 200, various kinds of information about the air-cleaning device 1000 which is registered in association with the mobile terminal 300 in the cloud server 200. Examples of the mobile terminal 300 include a smartphone and a tablet terminal. One mobile terminal 300 is able to remotely operate a plurality of air-cleaning devices 1000. Further, a plurality of mobile terminals 300 are able to remotely operate one air-cleaning device 1000.

In addition, the speech content table 110a described in Embodiment 4 described above is registered in the cloud server 200.

A wireless LAN (Wireless Local Area Network) which is a narrow-area communication network is available in the house of the user 500. The relay station 400 of the wireless LAN is connected to the wide-area communication network 600 that includes the Internet. The relay station 400 is a communication device, for example, such as a WiFi (registered trademark) router or a WiFi (registered trademark) access point. Though a configuration including the Internet is exemplified as the wide-area communication network 600 in the present embodiment, a telephone network, a mobile communication network, a CATV (CAble Television) communication network, a satellite communication network, or the like is also usable.

The cloud server 200 and the air-cleaning device 100C are allowed to communicate with each other through the wide-area communication network 600 and the relay station 400 of the wireless LAN. The cloud server 200 and the mobile terminal 300 are allowed to communicate with each other through the wide-area communication network 600. The mobile terminal 300 and the Internet in the wide-area communication network 600 are connected by using 3G (3rd Generation), LTE (Long Term Evolution), a WiFi (registered trademark) access point in the house or a public place, or the like. Note that, both of the air-cleaning device 100C and the mobile terminal 300 are wireless communication devices and are also able to communicate with each other through the relay station 400 without using the wide-area communication network 600. Note that, a well-known one is usable as the cloud server 200 and the mobile terminal 300, so that detailed description thereof will be omitted.

In this manner, by storing the speech content table 110*a* in the cloud server 200, it becomes unnecessary to store the speech content table 110*a* in the air-cleaning device 100C.

[Example of Realization by Software]

Control blocks (the first determination unit 11, the second determination unit 12, the operation control unit 13, 13A, 13B, or 13C, the rotation control unit 15, the person detection sensor control unit 16, the output value acquisition unit 111, the motion degree determination unit 112, the non-detection time measurement unit 113, and the presence/absence determination unit 114) of the air-cleaning device (100, 100A, 100B, or 100C) may be realized by a logic circuit (hardware) formed in an integrated circuit (IC chip) or the like or may be realized by software with use of a CPU (Central Processing Unit).

In the latter case, the air-cleaning device (100, 100A, 100B, or 100C) includes a CPU that executes a command of a program that is software enabling each of functions, a ROM (Read Only Memory) or a storage device (each referred to as a "recording medium") in which the program and various kinds of data are recorded so as to be readable by a computer (or a CPU), a RAM (Random Access Memory) that develops the program, and the like. An object of the invention is achieved by a computer (or a CPU) reading and executing the program from the recording medium. As the recording medium, for example, a "non-transitory tangible medium" such as a tape, a disk, a card, a semiconductor memory, or a programmable logic circuit is able to be used. The program may be supplied to the computer via any transmission medium (such as a communication network or a broadcast wave) which allows the program to be transmitted. Note that, an aspect of the invention can also be achieved in a form of a data signal in which the program is embodied through electronic transmission and which is embedded in a carrier wave.

CONCLUSION

An air-cleaning device (100, 100A, 100B, 100C) according to an aspect 1 of the invention is an air-cleaning device mounted with a person detection sensor (31, 31B) that detects motion of a person and an illuminance sensor (32) that detects brightness in a room. The air-cleaning device (100, 100A, 100B, 100C) includes: a first determination unit (11) that determines, from a detection signal from the person detection sensor, whether a state of an air-cleaning target room (R) is at least any of a state (Sp1) where a person is absent in the air-cleaning target room (R), a state (Sp2) where a person is present in the air-cleaning target room and a motion amount is small, and a state (Sp3) where a person is present in the air-cleaning target room and the motion amount is large; a second determination unit (12) that determines, from a detection signal from the illuminance sensor, whether the state of the air-cleaning target room (R) is at least any of a state (S1) where it is bright inside the air-cleaning target room and a state (S2) where it is dark inside the air-cleaning target room; and an operation control unit (13, 13A, 13B) that controls an operation of an air-cleaning function by using determination results of the first determination unit and the second determination unit.

According to the aforementioned configuration, the air-cleaning device controls execution of the air-cleaning function by combining at least three states "where a person is absent in the air-cleaning target room, where a person is present in the air-cleaning target room and the motion amount is small, and where a person is present in the air-cleaning target room and the motion amount is large" and at least two states "where it is bright inside the air-cleaning target room and where it is dark inside the air-cleaning target room".

Accordingly, an effect that the air-cleaning device is able to execute the air-cleaning function by utilizing, as a determination target, not only presence/absence of a person in the air-cleaning target room but also whether the motion amount of the person in the room is large/small is exerted.

In the aspect 1, it is preferable that the air-cleaning device (100) according to an aspect 2 of the invention further includes at least one of a dust sensor (33) that detects dust and an odor sensor (34) that detects odor, in which when the first determination unit (11) determines that the state of the air-cleaning target room (R) is the state where a person is present in the air-cleaning target room (R) and the motion amount is large, the operation control unit (13) increases a sensitivity level of the dust sensor or the odor sensor, at which dust or odor is detected, and increases an air blow volume of air released from the air-cleaning device.

According to the aforementioned configuration, when the state is determined to be the state where a person is present in the air-cleaning target room and the motion amount is large, the sensitivity level of the dust sensor or the odor sensor, at which dust or odor is detected, is increased. Thus, dust or odor is able to be removed only by detecting generation of a smaller amount of dust or odor compared to a case of a normal operation. As a result, dust or odor is able to be suppressed even in a state where a person moves actively, dust easily floats, and odor is easily generated.

Further, when the state is determined to be the state where a person is present in the air-cleaning target room and the motion amount is large, the air blow volume of the air released from the air-cleaning device is increased. Thus, it is possible to quickly clean air even in a state where a person moves actively, a large amount of dust easily floats, and odor is generated.

In the aspect 1 or 2, it is preferable that the air-cleaning device (100) according to an aspect 3 of the invention further includes a display unit (4) that displays an operation state of the air-cleaning device, in which when the first determination unit (11) determines that the state of the air-cleaning target room (R) is the state where a person is absent in the air-cleaning target room, the operation control unit (13) suppresses brightness or turns off light of the display unit.

According to the aforementioned configuration, in a case where a person to be notified of the operation state of the air-cleaning device is not present around the air-cleaning device, it is possible to suppress brightness or turn off light of the display unit. This makes it possible to suppress power consumption.

In any of the aspects 1 to 3, it is preferable that, in the air-cleaning device (100) according to an aspect 4 of the invention, when the second determination unit (12) determines that the state of the air-cleaning target room (R) is the state where it is dark inside the air-cleaning target room (R), the operation control unit (13) reduces the air blow volume of the air released from the air-cleaning device.

According to the aforementioned configuration, when a person is in a quiet state, the air-cleaning device is able to operate quietly. This makes it possible to perform an operation of the air-cleaning device that does not interfere with an action of the person.

In any of the aspects 1 to 4, it is preferable that, in the air-cleaning device (100) according to an aspect 5 of the invention, when a non-detection period in which the person detection sensor (31) does not continuously detect a person continues for a duration time or more, the first determination unit (11) determines that the state of the air-cleaning target room (R) is the state where a person is absent in the air-cleaning target room (R), and the duration time when it is bright inside the air-cleaning target room is shorter than the duration time when it is dark inside the air-cleaning target room.

According to the aforementioned configuration, the duration time when the state is determined to be the state where it is dark inside the air-cleaning target room is longer than the duration time when the state is determined to be the state where it is bright inside the air-cleaning target room. Thus, even when it is dark inside the air-cleaning target room and a person does not move actively because of sleeping or the like, it is possible to eliminate erroneous determination that the person is absent.

In any of the aspects 1 to 5, it is preferable that, in the air-cleaning device (100) according to an aspect 6 of the invention, when the first determination unit (11) determines that the state of the air-cleaning target room (R) is the state where a person is absent in the air-cleaning target room (R) and the second determination unit (12) determines that the state of the air-cleaning target room (R) is the state where it is dark inside the air-cleaning target room, the operation control unit (13) performs control to increase the air blow volume of the air released from the air-cleaning device.

According to the aforementioned configuration, by increasing the air blow volume of the air released from the air-cleaning device in a state where noise does not matter, it is possible to quickly clean air.

In any of the aspects 1 to 6, it is preferable that the air-cleaning device (100A) according to an aspect 7 of the invention further includes a humidifier (5) that humidifies the inside of the air-cleaning target room (R), in which when the first determination unit (11) determines that the state of the air-cleaning target room (R) is the state where a person is absent in the air-cleaning target room, the operation control unit (13A) performs control to stop an operation of the humidifier and increase the air blow volume of the air released from the air-cleaning device.

According to the aforementioned configuration, it is possible that the operation of the humidifier is not allowed when a person is absent, thus making it possible to suppress power consumption. Further, since noise does not matter when a person is absent, by increasing the air blow volume, it is possible to quickly clean air.

In any of the aspects 1 to 7, it is preferable that the air-cleaning device (100B) according to an aspect 8 of the invention further includes: a base (50) that rotates a section of the air-cleaning device, in which the person detection sensor (31B) is provided, around a rotational shaft extending in a vertical direction; a rotation control unit (15) that controls driving of the base; and a person detection sensor control unit (16) that controls driving of the person detection sensor, in which the rotation control unit intermittently operates driving of the base, and the person detection sensor control unit stops driving of the person detection sensor when the base is driven and drives the person detection sensor when the base is stopped.

According to the aforementioned configuration, since driving of the person detection sensor is stopped when the section of the air-cleaning device, which includes the person detection sensor, rotates, it is possible to avoid a case where the person detection sensor erroneously determines the person detection as "presence" even though a heat source itself does not move. Further, the person detection sensor performs person detection at each place where the section of the air-cleaning device rotates and stops, so that the person detection is able to be performed in a wider range than a case where person detection is performed in a state where the person detection sensor is constantly fixed.

In the aspect 8, it is preferable that, in the air-cleaning device (100B) according to an aspect 9 of the invention, the rotation control unit decides, in accordance with a detection range of the person detection sensor, a rotation angle of the section of the air-cleaning device at a time of driving the base.

According to the aforementioned configuration, the rotation angle of the section of the air-cleaning device at the time of driving the base is decided in accordance with the detection range of the person detection sensor, it is possible to cover an invalid detection range of the person detection sensor while driving of the person detection sensor is stopped at the time of driving the base.

In any of the aspects 1 to 9, the air-cleaning device (100C) according to an aspect 10 of the invention may further include: a sound output unit 17 that produces a speech content associated with a device state indicating a state of the air-cleaning device; a device state detection unit (sensor unit 14) that detects the device state; a speech content extraction unit 13a that extracts the speech content associated with the device state detected by the device state detection unit (sensor unit 14); a speech control unit 13b that causes the sound output unit 17 to output, as sound, the speech content extracted by the speech content extraction unit 13a; and a person detection sensor 31 that detects motion of a person in a predetermined range of the air-cleaning device, in which the device state detection unit (sensor unit 14) may include an illuminance sensor 32 that detects illuminance around the air-cleaning device, and the speech control unit 13b may perform control about whether or not to cause the sound output unit 17 to output the sound in accordance with detection results of the person detection sensor 31 and the illuminance sensor 32.

According to the aforementioned configuration, sound guidance is performed in accordance with whether the room where the air-cleaning device is installed is dark or bright and whether motion of a person is present or absent, so that, for example, a case where the room is dark and motion of a person is not detected is a case where there is no person in the room or a person is sleeping, and therefore, there is no use performing sound guidance. In such a case, sound guidance is not performed so that waste processing does not need to be performed. Specific determination about whether or not to perform sound guidance is performed as follows.

In the aspect 10, in the air-cleaning device (100C) according to an aspect 11 of the invention, when brightness equal to or more than predetermined brightness is detected by the illuminance sensor 32 and motion of a person is detected by the person detection sensor 31, the speech control unit 13b may cause the sound output unit 17 to output the sound. In this case, assumed is a case where the room is bright and the person acts, so that sound guidance is immediately performed.

In the aspect ID, in the air-cleaning device (100C) according to an aspect 12 of the invention, when darkness equal to or more than predetermined darkness is detected by the illuminance sensor 32 and motion of a person is detected by the person detection sensor 31, the speech control unit 13b may not cause the sound output unit 17 to output the sound. In this case, since the room is dark, it is assumed that the person in the room is sleeping, so that sound guidance is not performed.

In the aspect 10, in the air-cleaning device (1000) according to an aspect 13 of the invention, when brightness equal to or more than predetermined brightness is detected by the illuminance sensor 32 after predetermined time has lapsed in a state where darkness equal to or more than predetermined darkness is detected by the illuminance sensor 32 and motion of a person is detected by the person detection sensor 31, the speech control unit 13h may cause the sound output unit 17 to output the sound. In this case, assumed is a case where the person returns to the dark room and turns on a light after the predetermined time has lapsed, so that sound guidance is performed when the room becomes bright.

The invention is not limited to each of the embodiments described above, and may be modified in various manners within the scope indicated in the claims and an embodiment achieved by appropriately combining technical means disclosed in different embodiments is also encompassed in the technical scope of the invention. Further, by combining the technical means disclosed in each of the embodiments, a new technical feature may be formed.

REFERENCE SIGNS LIST 4 display unit
5 humidifier
11 first determination unit.
12 second determination unit
13, 13A, 13B, 13C operation control unit
13a speech content extraction unit
13b speech control unit
14 sensor unit (device state detection unit)
15 rotation control unit
16 person detection sensor control unit
17 sound output unit
31, 315 person detection sensor
32 illuminance sensor
33 dust sensor
34 odor sensor
50 base
100, 100A, 100B, 1000 air-cleaning device
110 storage unit
110a speech content table

The invention claimed is:

1. An air-cleaning device mounted with a person detection sensor that detects motion of a person and an illuminance sensor that detects brightness in a room, the air-cleaning device comprising:
   a first determination unit that determines, from a detection signal from the person detection sensor, whether a state of an air-cleaning target room is at least any of a state where a person is absent in the air-cleaning target room, a state where a person is present in the air-cleaning target room and a motion amount is small, and a state where a person is present in the air-cleaning target room and the motion amount is large;
   a second determination unit that determines, from a detection signal from the illuminance sensor, whether the state of the air-cleaning target room is at least any of a state where it is bright inside the air-cleaning target room and a state where it is dark inside the air-cleaning target room; and
   an operation control unit that controls an operation of an air-cleaning function by using determination results of the first determination unit and the second determination unit,
   wherein
   when a non-detection period in which the person detection sensor does not continuously detect a person continues for a duration time or more, the first determination unit determines that the state of the air-cleaning target room is the state where a person is absent in the air-cleaning target room, and
   the duration time when it is bright inside the air-cleaning target room is different from the duration time when it is dark inside the air-cleaning target room.

2. The air-cleaning device according to claim 1, further comprising
   at least one of a dust sensor that detects dust and an odor sensor that detects odor, wherein
   when the first determination unit determines that the state of the air-cleaning target room is the state where a person is present in the air-cleaning target room and the motion amount is large, the operation control unit increases a sensitivity level of the dust sensor or the odor sensor, at which dust or odor is detected, and increases an air blow volume of air released from the air-cleaning device.

3. The air-cleaning device according to claim 1, further comprising
   a display unit that displays an operation state of the air-cleaning device, wherein
   when the first determination unit determines that the state of the air-cleaning target room is the state where a person is absent in the air-cleaning target room, the operation control unit suppresses brightness or turns off light of the display unit.

4. The air-cleaning device according to claim 1, wherein
   when the second determination unit determines that the state of the air-cleaning target room is the state where it is dark inside the air-cleaning target room, the operation control unit reduces the air blow volume of the air released from the air-cleaning device.

5. The air-cleaning device according to claim 1, wherein
   when the first determination unit determines that the state of the air-cleaning target room is the state where a person is absent in the air-cleaning target room and the second determination unit determines that the state of the air-cleaning target room is the state where it is dark inside the air-cleaning target room, the operation control unit performs control to increase the air blow volume of the air released from the air-cleaning device.

6. The air-cleaning device according to claim 1, further comprising
a humidifier that humidifies an inside of the air-cleaning target room, wherein
when the first determination unit determines that the state of the air-cleaning target room is the state where a person is absent in the air-cleaning target room, the operation control unit performs control to stop an operation of the humidifier and increase the air blow volume of the air released from the air-cleaning device.

7. The air-cleaning device according to claim 1, further comprising:
a base that rotates a section of the air-cleaning device, in which the person detection sensor is provided, around a rotational shaft extending in a vertical direction;
a rotation control unit that controls driving of the base; and
a person detection sensor control unit that controls driving of the person detection sensor, wherein
the rotation control unit intermittently operates driving of the base, and
the person detection sensor control unit stops driving of the person detection sensor when the base is driven and drives the person detection sensor when the base is stopped.

8. The air-cleaning device according to claim 7, wherein the rotation control unit decides, in accordance with a detection range of the person detection sensor, a rotation angle of the section of the air-cleaning device at a time of driving the base.

9. The air-cleaning device according to claim 1, further comprising:
a sound output unit that produces a speech content associated with a device state indicating a state of the air-cleaning device;
a device state detection unit that detects the device state;
a speech content extraction unit that extracts the speech content associated with the device state detected by the device state detection unit; and
a speech control unit that causes the sound output unit to output, as sound, the speech content extracted by the speech content extraction unit, wherein
the person detection sensor that-detects motion of a person in a predetermined range of the air-cleaning device,
the illuminance sensor detects illuminance around the air-cleaning device, and
the speech control unit performs control about whether or not to cause the sound output unit to output the sound in accordance with detection results of the person detection sensor and the illuminance sensor.

10. The air-cleaning device according to claim 9, wherein
when brightness equal to or more than predetermined brightness is detected by the illuminance sensor and motion of a person is detected by the person detection sensor, the speech control unit causes the sound output unit to output the sound.

11. The air-cleaning device according to claim 10, wherein
when darkness equal to or more than predetermined darkness is detected by the illuminance sensor and motion of a person is detected by the person detection sensor, the speech control unit does not cause the sound output unit to output the sound.

12. The air-cleaning device according to claim 10, wherein
when brightness equal to or more than predetermined brightness is detected by the illuminance sensor after predetermined time has lapsed in a state where darkness equal to or more than predetermined darkness is detected by the illuminance sensor and motion of a person is detected by the person detection sensor, the speech control unit causes the sound output unit to output the sound.

13. An air-cleaning device mounted with a person detection sensor that detects motion of a person and an illuminance sensor that detects brightness in a room, the air-cleaning device comprising:
a first determination unit that determines, from a detection signal from the person detection sensor, whether a state of an air-cleaning target room is at least any of a state where a person is absent in the air-cleaning target room, a state where a person is present in the air-cleaning target room and a motion amount is small, and a state where a person is present in the air-cleaning target room and the motion amount is large;
a second determination unit that determines, from a detection signal from the illuminance sensor, whether the state of the air-cleaning target room is at least any of a state where it is bright inside the air-cleaning target room and a state where it is dark inside the air-cleaning target room;
an operation control unit that controls an operation of an air-cleaning function by using determination results of the first determination unit and the second determination unit;
a sound output unit that produces a speech content associated with a device state indicating a state of the air-cleaning device;
a device state detection unit that detects the device state;
a speech content extraction unit that extracts the speech content associated with the device state detected by the device state detection unit; and
a speech control unit that causes the sound output unit to output, as sound, the speech content extracted by the speech content extraction unit, wherein
the person detection sensor detects motion of a person in a predetermined range of the air-cleaning device,
the illuminance sensor detects illuminance around the air-cleaning device,
the speech control unit performs control about whether or not to cause the sound output unit to output the sound in accordance with detection results of the person detection sensor and the illuminance sensor, and
when brightness equal to or more than predetermined brightness is detected by the illuminance sensor after predetermined time has lapsed in a state where darkness equal to or more than predetermined darkness is detected by the illuminance sensor and motion of a person is detected by the person detection sensor, the speech control unit causes the sound output unit to output the sound.

* * * * *